(12) United States Patent
Yea et al.

(10) Patent No.: US 11,405,615 B2
(45) Date of Patent: Aug. 2, 2022

(54) JOINT TRANSFORM CODING OF MULTIPLE COLOR COMPONENTS

(71) Applicant: Tencent America LLC, Palo Alto, CA (US)

(72) Inventors: Sehoon Yea, Palo Alto, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 91 days.

(21) Appl. No.: 17/083,662

(22) Filed: Oct. 29, 2020

(65) Prior Publication Data

US 2021/0306634 A1  Sep. 30, 2021

Related U.S. Application Data

(60) Provisional application No. 63/000,109, filed on Mar. 26, 2020.

(51) Int. Cl.
| | |
|---|---|
| *H04N 7/12* | (2006.01) |
| *H04N 19/126* | (2014.01) |
| *H04N 19/61* | (2014.01) |
| *H04N 19/186* | (2014.01) |
| *H04N 19/12* | (2014.01) |
| *H04N 19/189* | (2014.01) |

(52) U.S. Cl.
CPC ........... *H04N 19/126* (2014.11); *H04N 19/12* (2014.11); *H04N 19/186* (2014.11); *H04N 19/189* (2014.11); *H04N 19/61* (2014.11)

(58) Field of Classification Search
CPC ..................................................... H04N 19/61
See application file for complete search history.

(56) References Cited

U.S. PATENT DOCUMENTS

2019/0306522 A1  10/2019  Said et al.
2019/0313097 A1  10/2019  Urban et al.

OTHER PUBLICATIONS

Peter De Rivaz et al., "AV1 Bitstream & Decoding Process Specification", The Alliance for Open Media, last modified 2019, 681 pages, Version 1.0.0 with Errata 1.
Benjamin Bross et al., "Versatile Video Coding (Draft 7)" (Draft text of video coding specification), Joint Video Experts Team (JVET) of ITU-T SG 16 WP 3 and ISO/IEC JTC 1/SC 29/WG 11, 16th Meeting, JVET-P2001vE, Oct. 1-11, 2019, Geneva, CH, 492 pages.
Written Opinion of the International Searching Authority dated May 6, 2021, in International Application No. PCT/US21/19371.
International Search Report dated May 6, 2021, in International Application No. PCT/US21/19371.

*Primary Examiner* — Y Lee
(74) *Attorney, Agent, or Firm* — Sughrue Mion, PLLC

(57) ABSTRACT

There is included a method and apparatus comprising computer code configured to cause a processor or processors to perform receiving video data in an AOMedia Video 1 (AV1) format comprising data of at least two chroma prediction-residual signal blocks, a transformation between at least one signal block, having a size less than or equal to a combination of the chroma prediction-residual signal blocks, and the chroma prediction-residual signal blocks, and decoding the video data based on an output of the transformation comprising the at least one signal block having the size less than or equal to the combination of the chroma prediction-residual blocks.

14 Claims, 19 Drawing Sheets

JOINT TRANSFORM CODING OF MULTIPLE COLOR COMPONENTS

CROSS-REFERENCES TO RELATED APPLICATIONS/PRIORITY CLAIM

The present application claims priority to provisional application US 63/000,109 filed on Mar. 26, 2020 which is hereby expressly incorporated by reference, in its entirety, into the present application.

FIELD

This disclosure relates generally to field of data processing, and more particularly to video encoding and/or decoding.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. In AV1, there is a total 56 directional angles, of which 8 are nominal angles and the remainder are specified as a delta from the nominal angles.

Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. With careful evaluation, JVET formally launched the standardization of next-generation video coding beyond HEVC, i.e., the so-called Versatile Video Coding (VVC).

In AV1, prediction residual signals are generated for chroma channels, e.g., Cb and Cr, by various means and applied for in intra and inter coding scenarios, respectively. Since same sets of prediction methods are applied to Cb and Cr channels in most cases, the resulting residual signals from different chroma channels tend to be correlated in a certain way that can be categorized. Note that AV1 does not have coding tools to remove such redundancy for better compression efficiency. On the other hand, even though the current VVC design does provide one way of leveraging on such tendencies, it is limited in the sense that it utilizes the correlation only between the two co-located chroma samples.

SUMMARY

This disclosure presents a set of advanced video coding technologies. More specifically, a transform scheme for joint coding of residuals from multiple color components, e.g., residuals from two chroma components, is disclosed.

There is included a method and apparatus comprising memory configured to store computer program code and a processor or processors configured to access the computer program code and operate as instructed by the computer program code. The computer program includes receiving code configured to cause the at least one processor to receive video data in an AOMedia Video 1 (AV1) format comprising data of at least two chroma prediction-residual signal blocks, performing code configured to cause the at least one processor to perform a transformation between at least one signal block, having a size less than or equal to a combination of the chroma prediction-residual signal blocks, and the chroma prediction-residual signal blocks, and decoding code configured to cause the at least one processor to decode the video data based on an output of the transformation comprising the at least one signal block having the size less than or equal to the combination of the chroma prediction-residual blocks.

According to exemplary embodiments, the chroma prediction-residual signal blocks comprise an N1×N2 Cb residual block and an N1×N2 Cr residual block.

According to exemplary embodiments, the transformation comprises dequantizing signaled indices of coefficients of the at least one signal block, having the size less than or equal to the combination of the chroma prediction-residual signal blocks, and transforming the dequantized signaled indices by a 2×N1×N2 by L×M matrix, and 2×N1×N2 is a size of the combination of the chroma prediction-residual blocks, and L×M is the size less than or equal to the combination of the chroma prediction residual blocs.

According to exemplary embodiments, a result of transforming the dequantized signaled indices by a 2×N1×N2 by L×M matrix comprises a reconstructed 2×N1×N2 vector, and decoding the video data comprises reconstructing the N1×N2 Cb residual block and the N1×N2 Cr residual block from the reconstructed 2×N1×N2 vector.

According to exemplary embodiments, the at least one signal block comprises an interleaving of the at least two chroma prediction-residual signal blocks.

According to exemplary embodiments, the at least one signal block comprises a 2×N1×N2 three-dimensional (3-D) cubic.

According to exemplary embodiments, the transformation comprises an N1-point 1-D transform, on each of N1×1 vectors along an x-axis of the 3-D cubic, an N2-point 1-D transform, on each of N2×1 vectors along a y-axis of the 3-D cubic, and a 2-point 1-D transform on each of 2×1 vectors along a z-axis of the 3-D cubic.

According to exemplary embodiments, the transformation comprises a two-point 1-D transform, on each of 2×1 vectors along a z-axis of the 3-D cubic, and an N1×N2 transform on an x-y plane of the 3-D cubic.

According to exemplary embodiments, performing the transformation comprises performing a primary transformation and a secondary transformation.

According to exemplary embodiments, at least one of the primary transformation and the secondary transformation comprises setting coefficients to zero in response to determining a predetermined condition in which a value of a coordinate associated with a coefficient of at least one of the chroma prediction-residual signal blocks is greater than or equal a threshold value.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, encode and/or decode video data using delta angle values derived from nominal angle values. Therefore, some embodiments have the capacity to improve the field of computing by not requiring every delta angle to be signaled and allowing for on-the-fly calculations of delta angle values.

As previously described, AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. In AV1, there is a total 56 directional angles, of which 8 are nominal angles and the remainder are specified as a delta from the nominal angles. However, both the nominal angles and the delta angles of all directional modes are signalled for chroma component, regardless of the collocated luma prediction modes. Additionally, delta angles are allowed for both luma and chroma intra prediction modes, but the correlation of the delta angles between luma and chroma component is not used. It may be advantageous, therefore, to derive delta angle values for the chroma component based on nominal angles from the luma component instead of signaling all 56 angle values.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
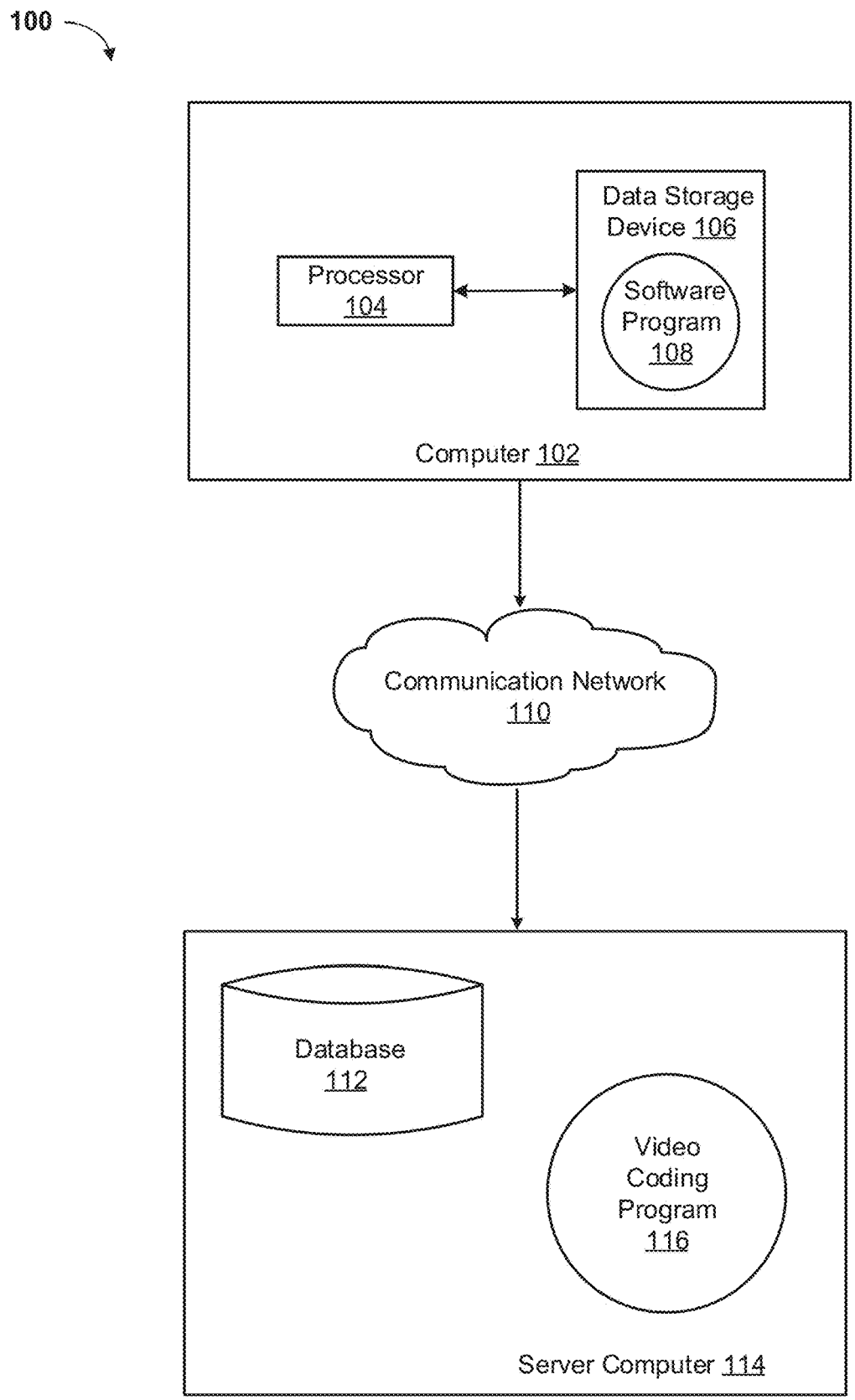
FIG. 1 illustrates a networked computer environment according to at least one embodiment.

Referring now to FIG. 1, a functional block diagram of a networked computer environment illustrating a video coding system 100 (hereinafter "system") for encoding and/or decoding video data using delta angles derived from nominal angles. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for encoding video data is enabled to run a Video Encoding Program 116 (hereinafter "program") that may interact with a database 112. The Video Encoding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video encoding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
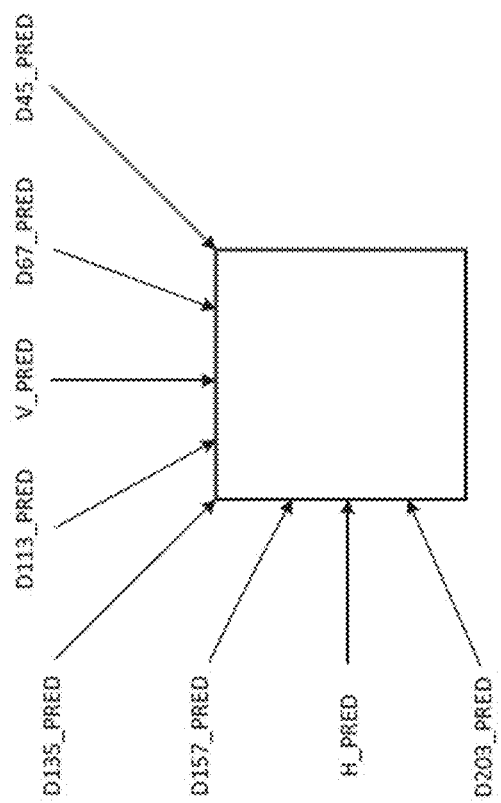
FIG. 2 is a diagram of the nominal angles of AV1, according to at least one embodiment.

Referring now to FIG. 2, a diagram 200 illustrating nominal angles of AV1 is depicted. VP9 supports 8 directional modes corresponding to angles from 45 to 207 degrees. To exploit more varieties of spatial redundancy in directional textures, in AV1, directional intra modes are extended to an angle set with finer granularity. In AV1, there are 8 nominal angles between 45 and 207 degrees that may include V_PRED, H_PRED, D45_PRED, D135_PRED, D113_PRED, D157_PRED, D203_PRED, and D67_PRED. For each nominal angle, there may be 7 finer angles, such that AV1 may have 56 directional angles in total. The prediction angle may be represented by a nominal intra angle plus an angle delta, which is −3~3 multiplies the step size of 3 degrees. The delta angles may not need to be signaled by the chroma component but may instead by derived according to the corresponding luma intra prediction modes.

In AV1, 8 nominal modes together with 5 non-angular smooth modes are firstly signaled, then if current mode is angular mode, an index is further signaled to indicate the angle delta to the corresponding nominal angle. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

In one or more embodiments, when the current chroma intra prediction mode is directional intra prediction mode and the nominal angle of the chroma intra prediction mode is equal to that of corresponding luma intra prediction mode, then the delta angle of the chroma component may be set equal to the delta angle of luma intra prediction mode. Otherwise, the delta angle of the chroma component may be set equal to 0.

In one or more embodiments, the delta angle of the chroma component may be set equal to the delta angle of the luma component, regardless of whether the nominal mode between luma and chroma is same or not.

In one or more embodiments, when the current chroma intra prediction mode is directional intra prediction mode and the nominal angle of the chroma intra prediction mode is equal to that of corresponding luma intra prediction mode, then the delta angle of the chroma component may be set equal to the delta angle of luma intra prediction mode. Otherwise, when the nominal angle of the chroma intra prediction mode is equal to the left/above neighboring modes of the corresponding luma block, then the delta angle of the chroma component may be set equal to that of left/above neighboring modes of the corresponding luma block. Otherwise, the delta angle of the chroma component may be set equal to 0.

In one or more embodiments, when semi-decoupled partitioning is applied, there may be multiple luma blocks associated with one chroma block. Therefore, multiple sample positions may be pre-defined, and the delta angles and nominal angles associated with these positions for predicting the co-located luma block may be identified. One or more of these identified nominal angles and delta angles may be used to derive the delta angles of current chroma block. In one example, the pre-defined sample positions may include the top-left and/or the center/middle samples. In another example, the pre-defined sample positions may include the four corner samples and the center/middle sample. In another example, the delta angles that may be used most frequently among the identified prediction modes may be used to derive the derive the delta angles of the chroma component. In another example, the pre-defined sample positions may include two selected positions of the four corner samples and one center/middle sample. In another example, the pre-defined sample positions may include three selected positions of the four corner samples and one center/middle sample.

In one or more embodiments, when the current chroma intra prediction mode is directional intra prediction mode and the nominal angle of the chroma intra prediction mode is equal to that of corresponding luma intra prediction mode, then the delta angle of the chroma component may be set equal to the delta angle of luma intra prediction mode. Otherwise, when the nominal angle of the chroma intra prediction mode is equal to the left/above neighboring modes of current chroma block, then the delta angle of the chroma component may be set equal to that of left/above neighboring modes of current chroma block. Otherwise, the delta angle of the chroma component may be set equal to 0.

The delta angle of the corresponding luma block may be used for the entropy coding of the delta angles of chroma intra prediction modes. In one or embodiments, the delta angle of the co-located luma blocks may be used as the context for the entropy coding of the delta angles of the chroma component. In one or more embodiments, the delta angle of the neighboring chroma blocks is used as the context for the entropy coding of the delta angles of the chroma component. In one or embodiments, instead of signaling the delta angles of the current chroma block, the absolute difference between delta angles of chroma blocks and the corresponding luma blocks may be signaled for the entropy coding of the chroma intra prediction modes. In one or more embodiments, the above embodiments are applied only when the nominal mode between luma and chroma may be same or when the absolute difference of prediction angles between these two modes is within a given threshold.

According to one or more embodiments, for entropy coding of the chroma intra prediction modes, a first flag may be signaled to indicate whether or not the current mode is chroma-from-luma (CfL). If the first flag is signaled as a value indicating CfL is not being used, a second flag may be signaled to indicate whether the current mode may be equal to the nominal mode of the corresponding luma block. If the current mode is equal to the nominal mode of the corresponding luma block, current mode is directional mode, and delta angles are allowed, then a third flag may be signaled to indicate the index of the delta angles. Otherwise, the third flag is signaled to indicate which of the remaining nominal modes current mode is. If the first flag is signaled as a value indicating CfL is not being used, the parameters of the CfL mode may be further signaled.

According to one or more embodiments, for entropy coding of the chroma intra prediction modes, the first flag may be signaled to indicate whether current mode may be equal to the nominal mode of the corresponding luma block or CfL mode. If the first flag is signaled as a value indicating the current mode is equal to the nominal mode of the corresponding luma block or CfL mode, the second flag may be signaled to indicate which of the two modes may be the current mode. If the current mode is equal to the nominal mode of the corresponding luma block, the current mode is directional mode, and delta angles are allowed, then the index of the delta angles may be further signaled. If the current mode is CfL mode, the parameters of the CfL mode may be further signaled. If the first flag is signaled as a value indicating the current mode is not equal to the nominal mode of the corresponding luma block or CfL mode, the second flag may be signaled to indicate which of the remaining nominal modes may be applied for the current chroma block.

In one or more embodiments, the first delta angle values may be entropy-coded based on using a delta angle of co-located luma blocks as a context in response to the nominal angle of the chroma component and the nominal angle of the luma component being the same or close to each other. The nominal angles may be close to each other when a difference of the between the nominal angles is less than or equal to 2 degrees. The delta angle values may be entropy-coded based on using a delta angle of co-located luma blocks as a context or based on using a delta angle of neighboring chroma blocks as a context.

Figure 3:
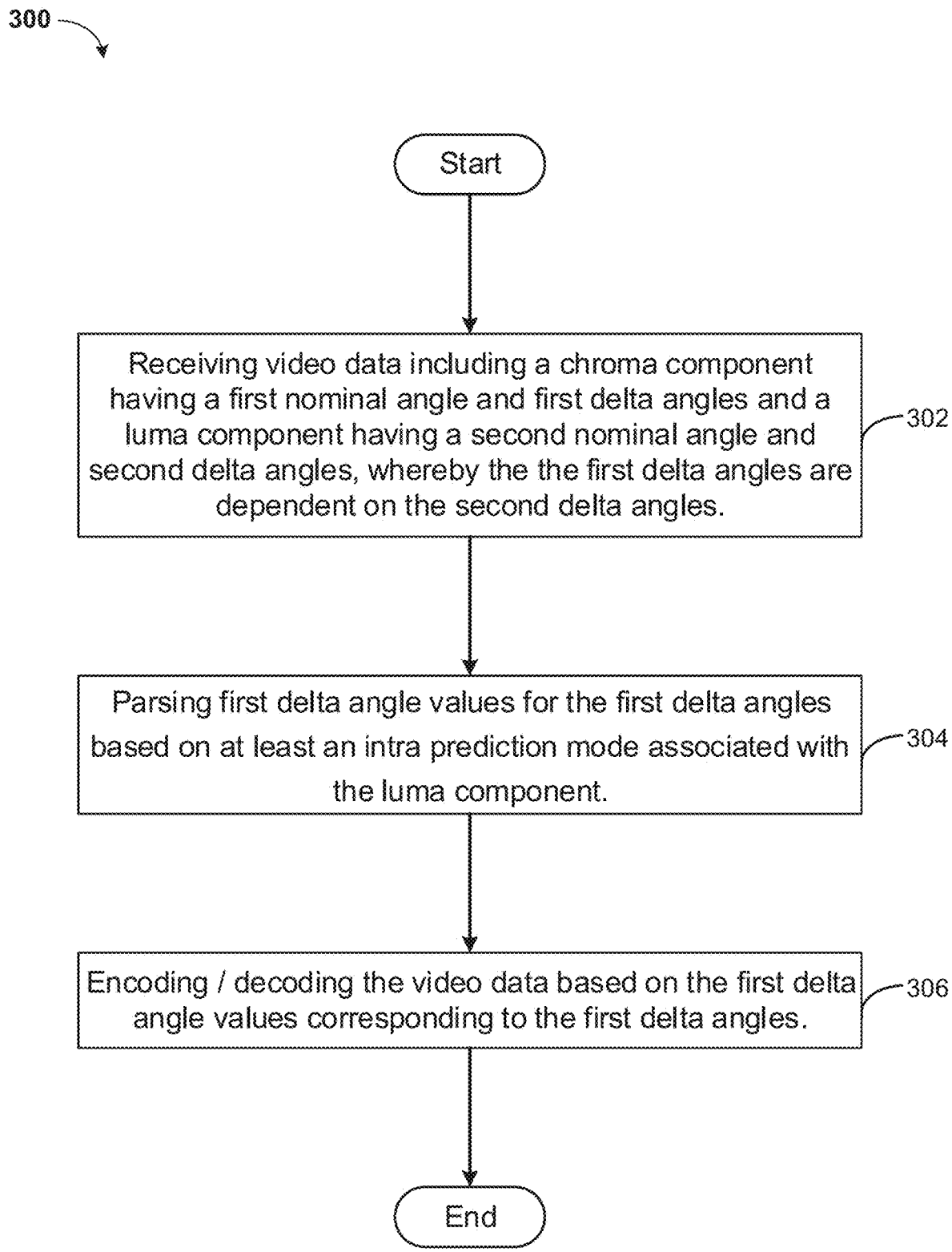
FIG. 3 is an operational flowchart illustrating the steps carried out by a program that codes video data, according to at least one embodiment.

It may be appreciated that, in one or more embodiments, the delta angles of luma and chroma blocks may use the separate contexts for entropy coding instead of sharing the same context among the delta angles of the luma and chroma blocks Referring now to FIG. 3, an operational flowchart illustrating the steps of a method 300 for encoding and/or decoding video data is depicted. In some implementations, one or more process blocks of FIG. 3 may be performed by the computer 102 (FIG. 1) and the server computer 114 (FIG. 1). In some implementations, one or more process blocks of FIG. 3 may be performed by another device or a group of devices separate from or including the computer 102 and the server computer 114.

At 302, the method 300 includes receiving video data including (1) a chroma component having a first nominal angle and first delta angles and (2) a luma component having a second nominal angle and second delta angles. The first delta angles are dependent on the second delta angles.

At 304, the method 300 includes signaling first delta angle values for the first delta angles based on at least an intra prediction mode associated with the luma component.

At 306, the method 300 includes encoding and/or decoding the video data based on the first delta angle values corresponding to the first delta angles.

It may be appreciated that FIG. 3 provides only an illustration of one implementation and does not imply any limitations with regard to how different embodiments may be implemented. Many modifications to the depicted environments may be made based on design and implementation requirements.

Figure 4:
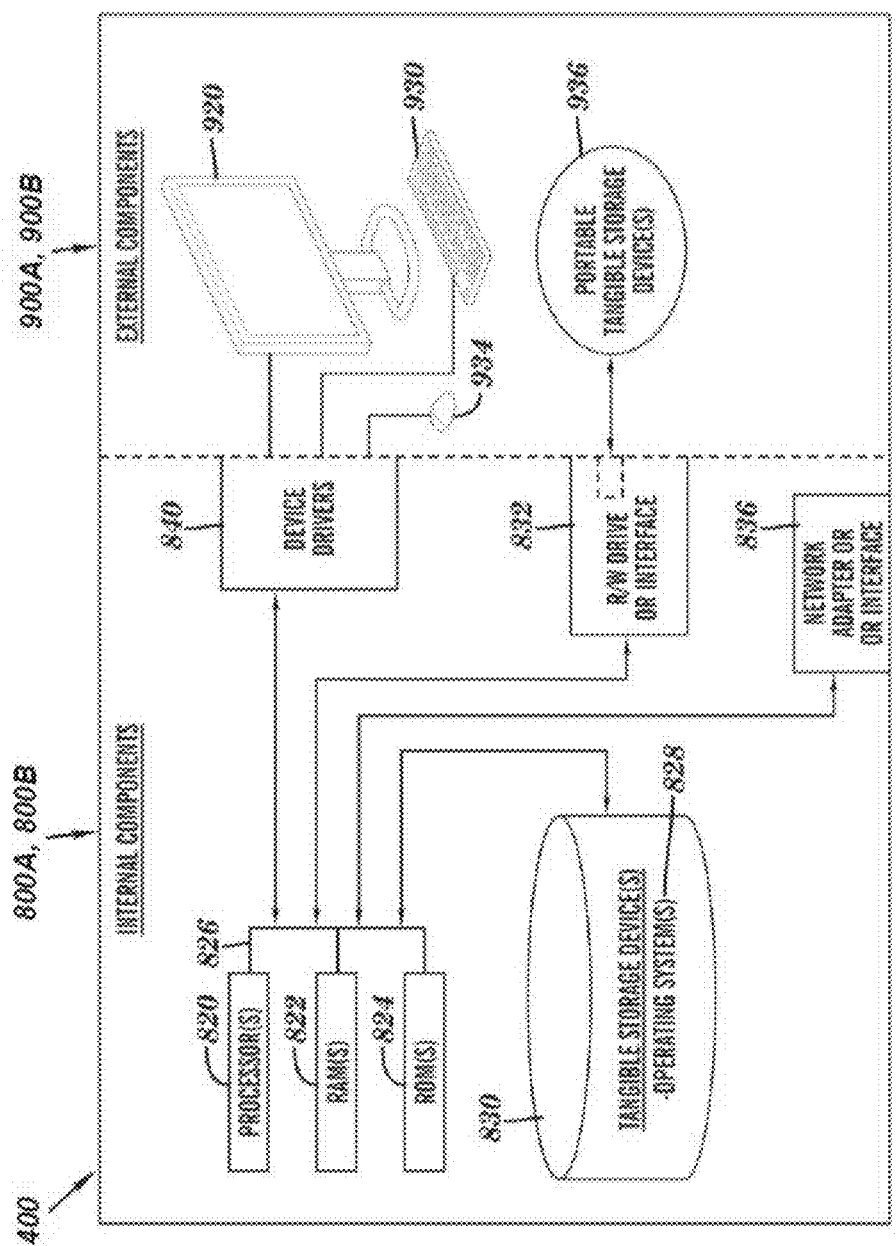
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Encoding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Encoding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Encoding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Encoding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
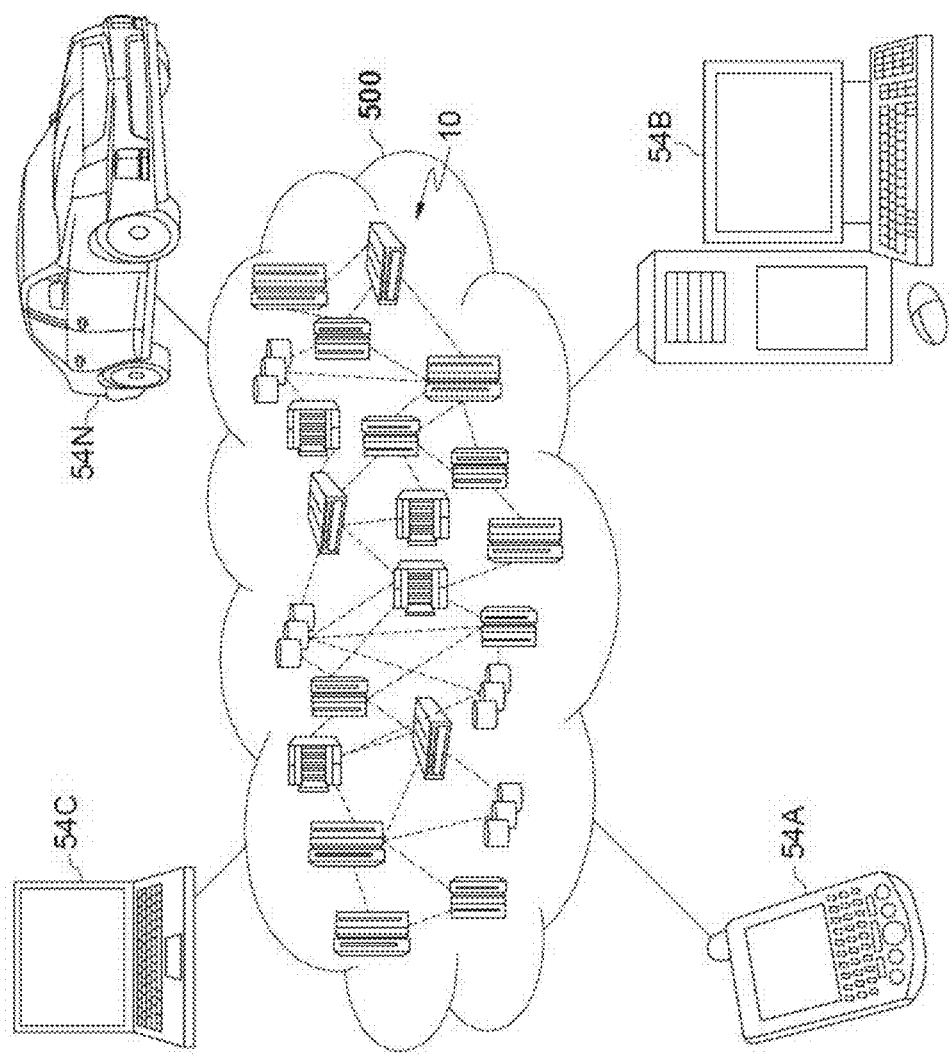
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
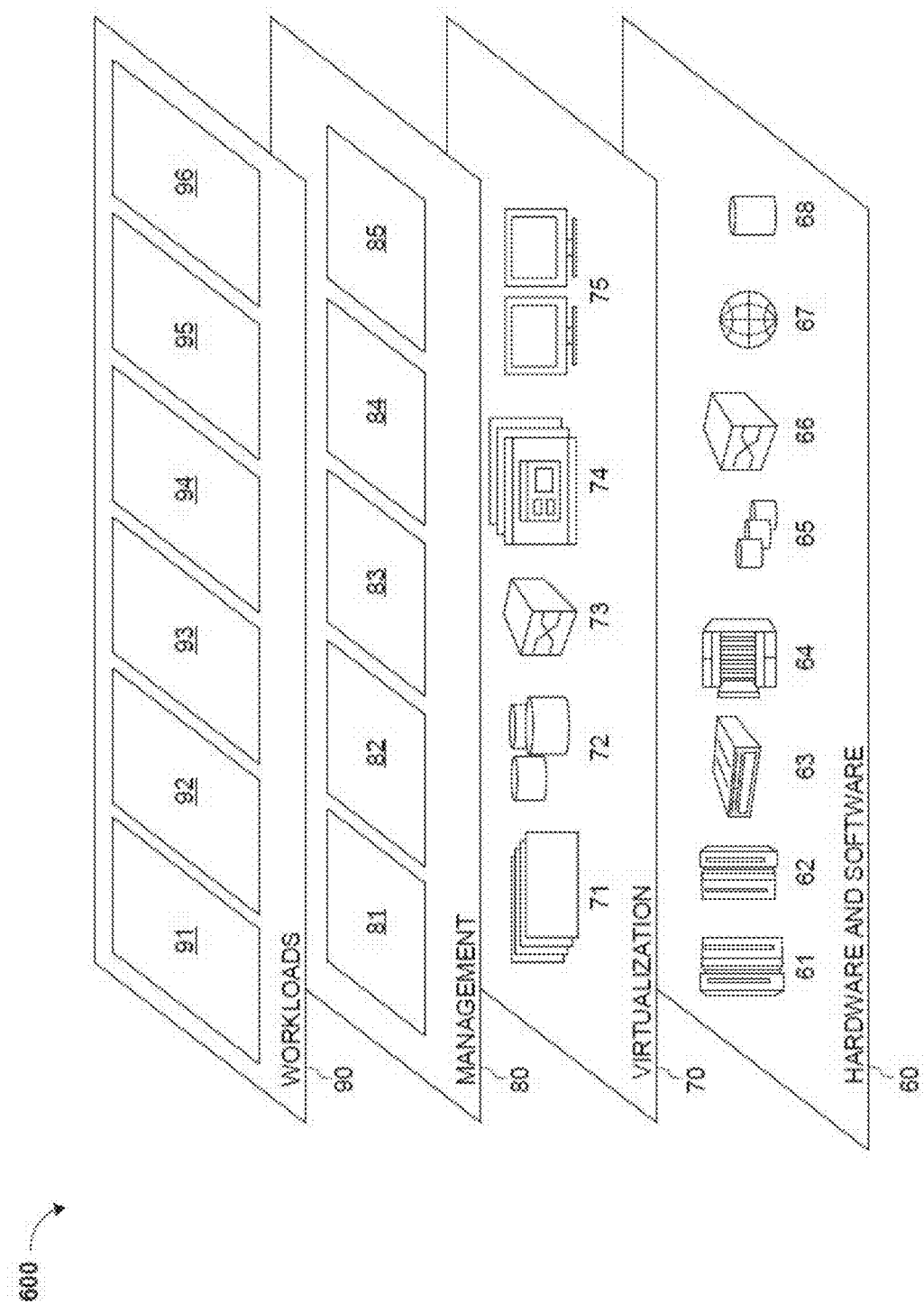
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96. Video Encoding/Decoding 96 may encode/decode video data using delta angles derived from nominal angles.

Figure 7:
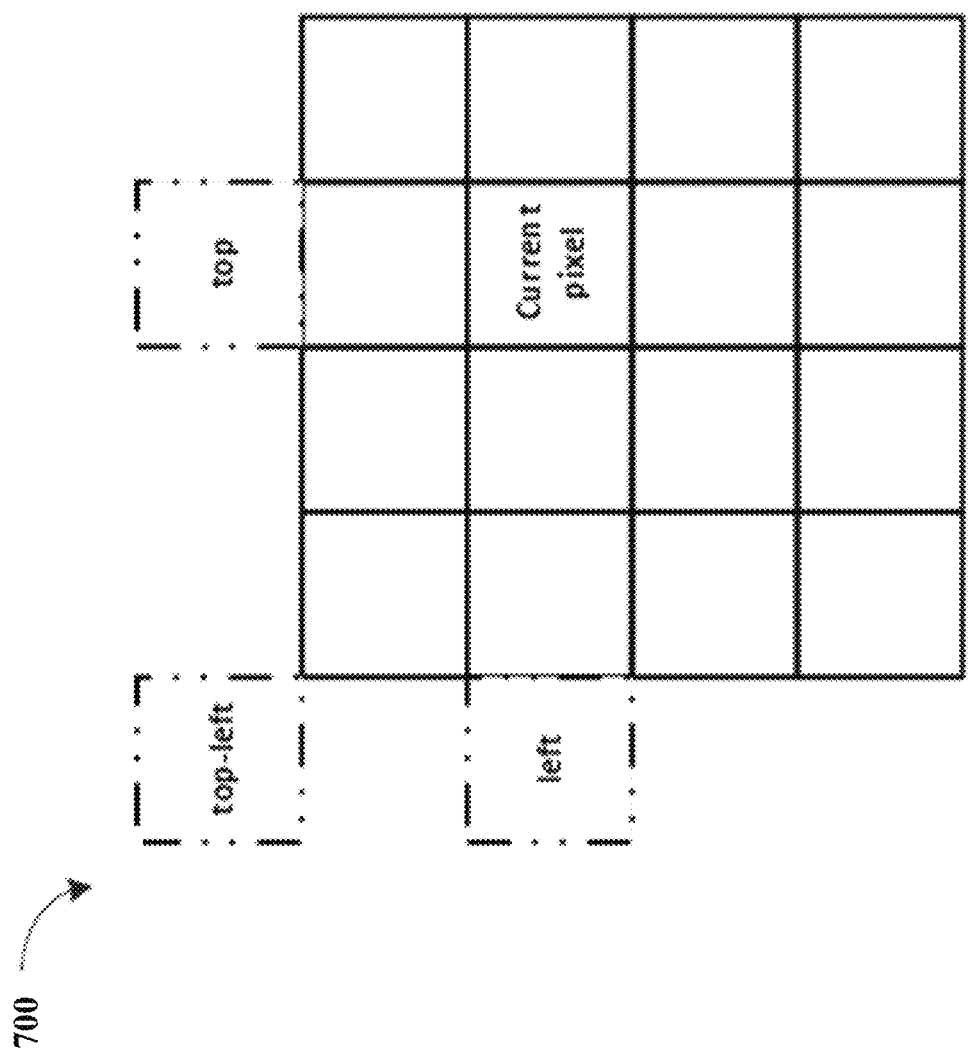
FIG. 7 is a block diagram of features with respect to non-directional smooth intra predictors in AVI according to exemplary embodiments.

FIG. 7 is a block diagram 700 of features with respect to non-directional smooth intra predictors in AV1 according to exemplary embodiments. For example, in AV1, there are 5 non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left and top-left reference samples are firstly fetched, and then the value which is closest to (top+left−topleft) is set as the predictor for the pixel to be predicted. FIG. 7 illustrates the positions of top, left, and top-left samples for one pixel in current block. For SMOOTH, SMOOTH_V, and SMOOTH_H modes, they predict the block using quadratic interpolation in the vertical or horizontal direction, or the average of both directions.

Figure 8:
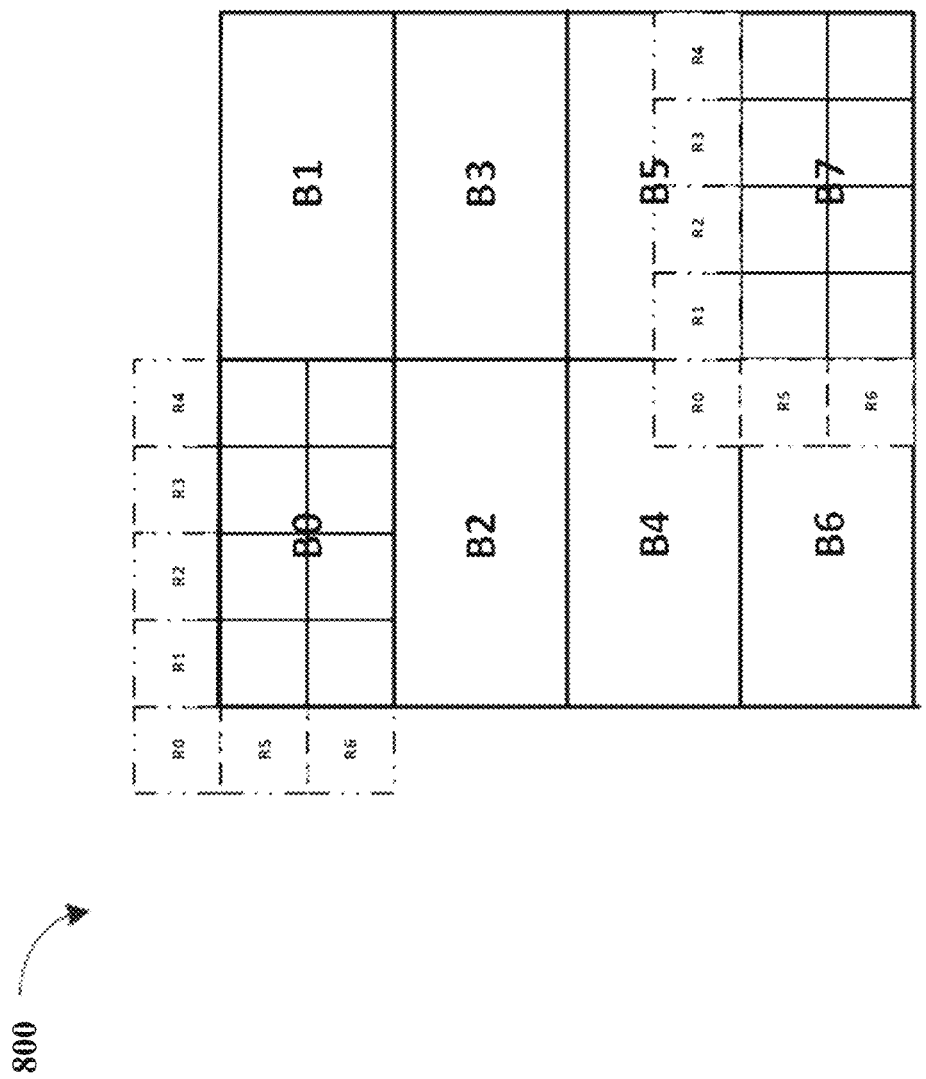
FIG. 8 is a block diagram of features with respect to recursive intra filtering modes according to exemplary embodiments.

FIG. 8 is a block diagram 800 of features with respect to recursive intra filtering modes according to exemplary embodiments. For example, to capture decaying spatial correlation with references on the edges, FILTER INTRA modes are designed for luma blocks. Five filter intra modes are pre-designed for AV1, each represented by a set of eight 7-tap filters reflecting correlation between pixels in a 4×2 patch and 7 neighbors adjacent to it. In other words, the weighting factors for 7-tap filter are position dependent. Take an 8×8 block for example, it is split into 8 4×2 patches, which is shown in FIG. 8. These patches are indicated by B0, B1, B1, B3, B4, B5, B6, and B7 in FIG. 8. For each patch, its 7 neighbors, indicated by R0~R7, are used to predict the pixels in current patch. For patch B0, all the neighbors are already reconstructed. But for other patches, some of the neighbors are not reconstructed, then the predicted values of immediate neighbors are used as the reference. For example, all the neighbors of patch B7 are not reconstructed, so the prediction samples of neighbors are used instead.

Chroma from Luma (CfL) is a chroma-only intra predictor that models chroma pixels as a linear function of coincident reconstructed luma pixels. The CfL prediction is expressed as follows (equation 1 ("Eq. 1")):

$$CfL(\alpha) = \alpha \times L^{AC} + DC \quad \text{Eq. 1}$$

wherein $L^{AC}$ denotes the AC contribution of luma component, $\alpha$ denotes the parameter of the linear model, and DC denotes the DC contribution of the chroma component. To be specific, the reconstructed luma pixels are subsampled into the chroma resolution, and then the average value is subtracted to form the AC contribution. To approximate chroma AC component from the AC contribution, instead of requiring the decoder to calculate the scaling parameters as in some prior art, AV1 CfL determines the parameter a based on the original chroma pixels and signals them in the bitstream. This reduces decoder complexity and yields more precise predictions. As for the DC contribution of the chroma component, it is computed using intra DC mode, which is sufficient for most chroma content and has mature fast implementations.

Figure 9:
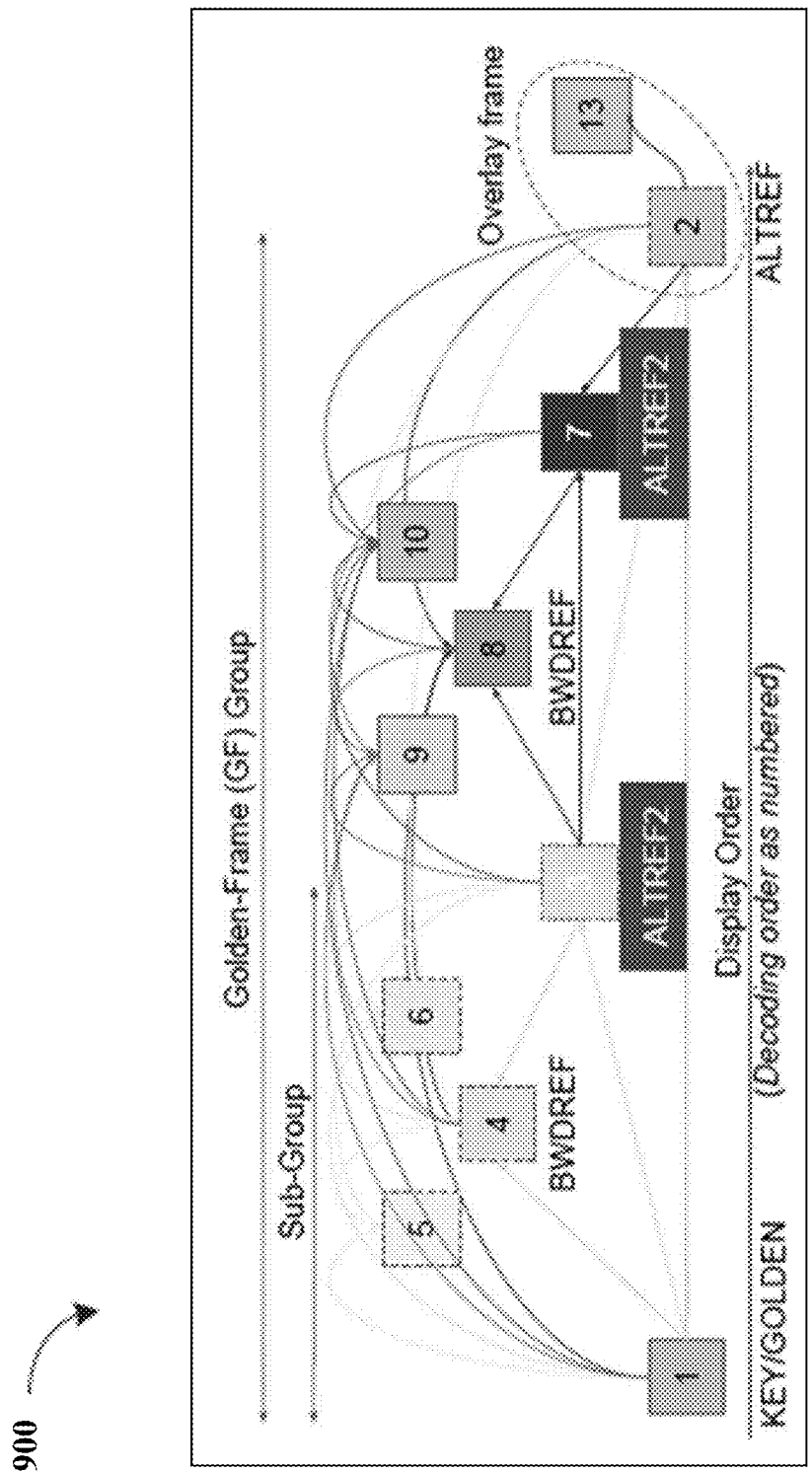
FIG. 9 is a block diagram of features with respect to a multi-layer reference frame structure according to exemplary embodiments.

FIG. 9 is a block diagram 900 of features with respect to a multi-layer reference frame structure according to exemplary embodiments. For example, there may be extended reference frames such that in addition to VP9's 3 reference frames, i.e., LAST (nearest past), GOLDEN (distant past), and ALTREF (temporally filtered future) frames, there are four more types of refence frames as follows:

LAST2 and LAST3: two near past frames
BWDREF, ALTREF2: two future frames
BWDREF is a look-ahead frame coded without temporal filtering and more useful as a backward reference in a relatively short distance.
ALTREF2 is an intermediate filtered future reference between GOLDEN and ALTREF.

Figure 10:
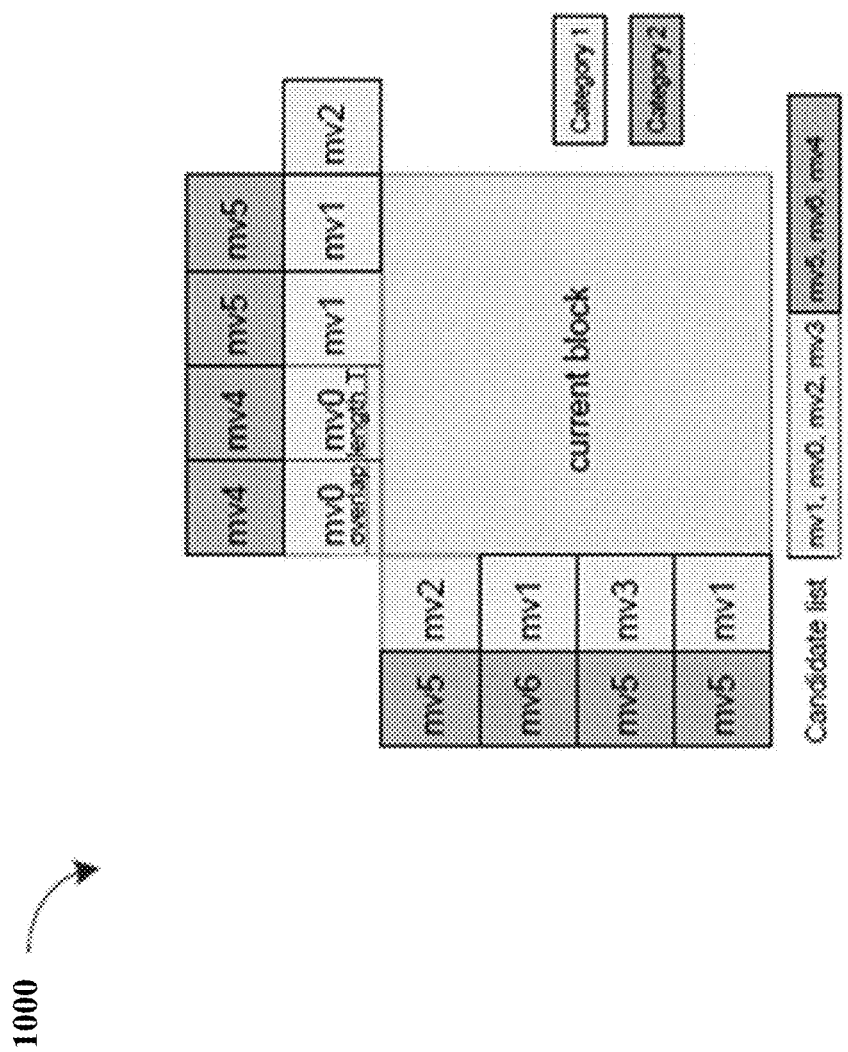
FIG. 10 is a block diagram of features with respect to candidate motion vector list building according to exemplary embodiments.

FIG. 10 is a block diagram 1000 of features with respect to candidate motion vector list building according to exemplary embodiments. For example, with dynamic spatial and temporal motion vector referencing, AV1 incorporates motion-vector reference selection schemes to efficiently code motion vectors. It uses wider spatial neighbors than its predecessor VP9 as well as motion-field estimation process to find temporal motion-vector reference candidates.

Figure 11:
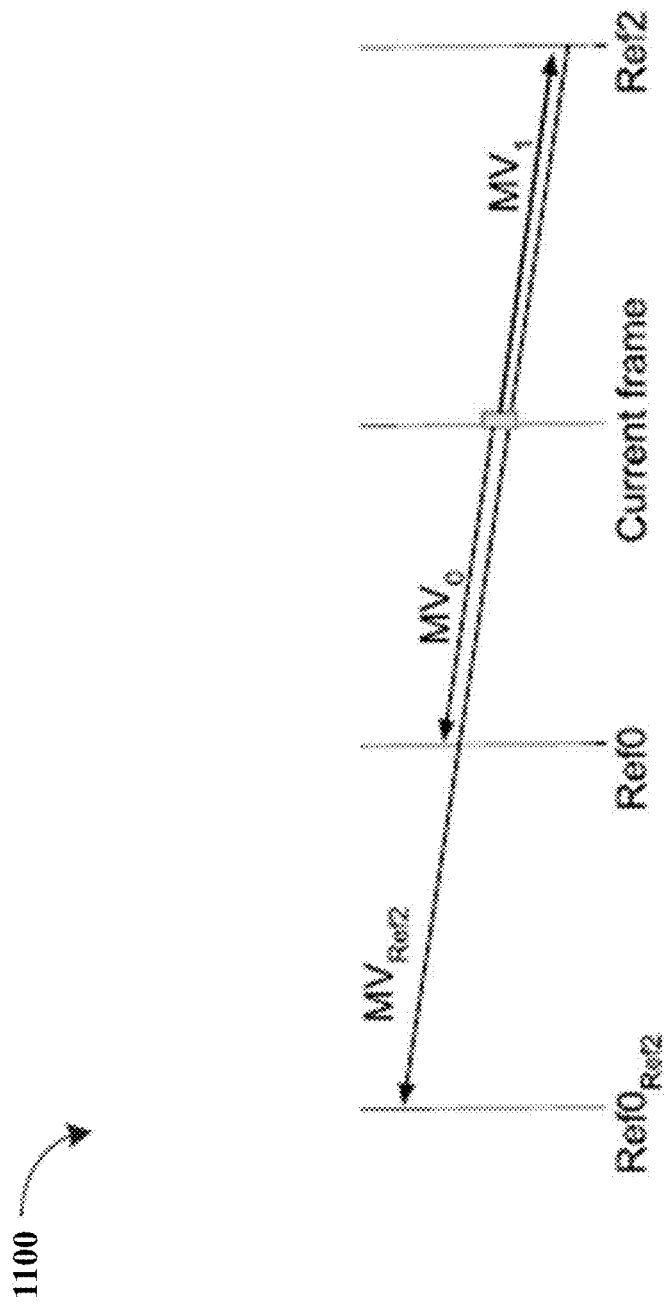
FIG. 11 is a line diagram of features with respect to motion-field estimation according to exemplary embodiments.

FIG. 11 is a line diagram 1100 of features with respect to motion-field estimation according to exemplary embodiments. For example, the motion-field estimation process searches through the collocated 128×128 area for all motion trajectories in 8×8 block resolution that pass each 64×64 processing unit. For example, in FIG. 11, the motion vector $MV_{Ref2}$ is searched over following the said process and the projected motion vectors such as $MV_0$ and $MV_1$ are derived.

Once all the candidate motion-vectors are found, they are sorted, merged, and ranked to build up to four final candidates. AV1 then signals the index of a selected reference motion vector from the list and optionally codes the motion vector difference.

Figure 12:
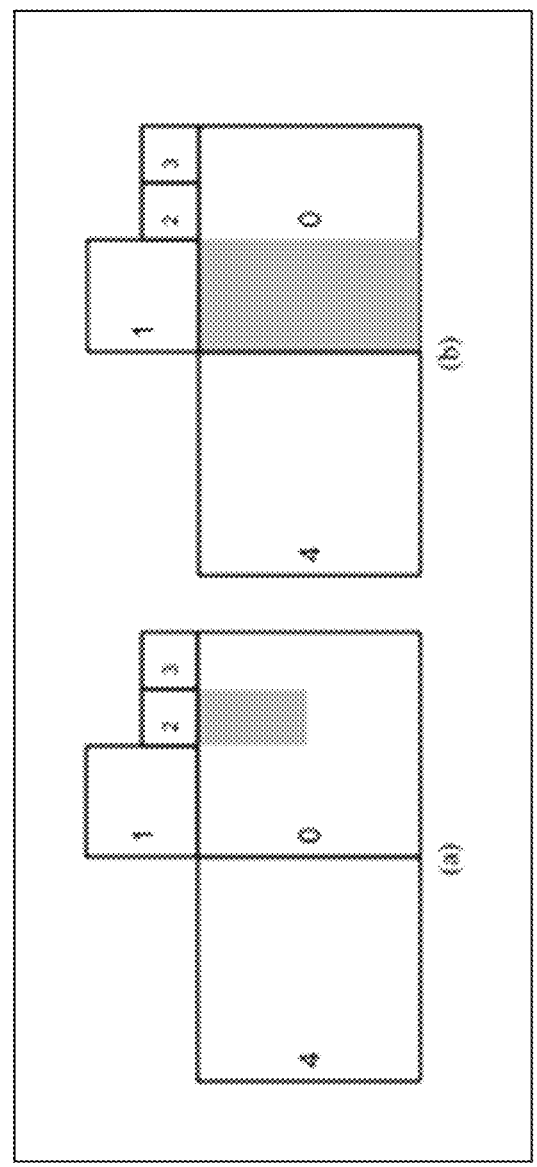
FIG. 12 is a block diagram of features with respect to overlapping regions for overlapped block motion compensation (OMBC) according to exemplary embodiments.

FIG. 12 is a block diagram 1200 of features with respect to overlapping regions for overlapped block motion compensation (OMBC) according to exemplary embodiments. For example, in order to decrease prediction errors around block boundaries by combining predictions obtained from adjacent motion vectors, AV1 progressively combines the block-based prediction with secondary predictors from the top and left edges by applying 1-D filters in vertical and horizontal directions, respectively. As an example, in FIG. 12, the shaded region of the predicted block 0 will be predicted by recursively generating blended prediction samples via a 1-D raised cosine filter. FIG. 12 shows the shaded regions to be predicted using a top-neighbor block 2 and the left-neighbor block 4, respectively.

Figure 13:
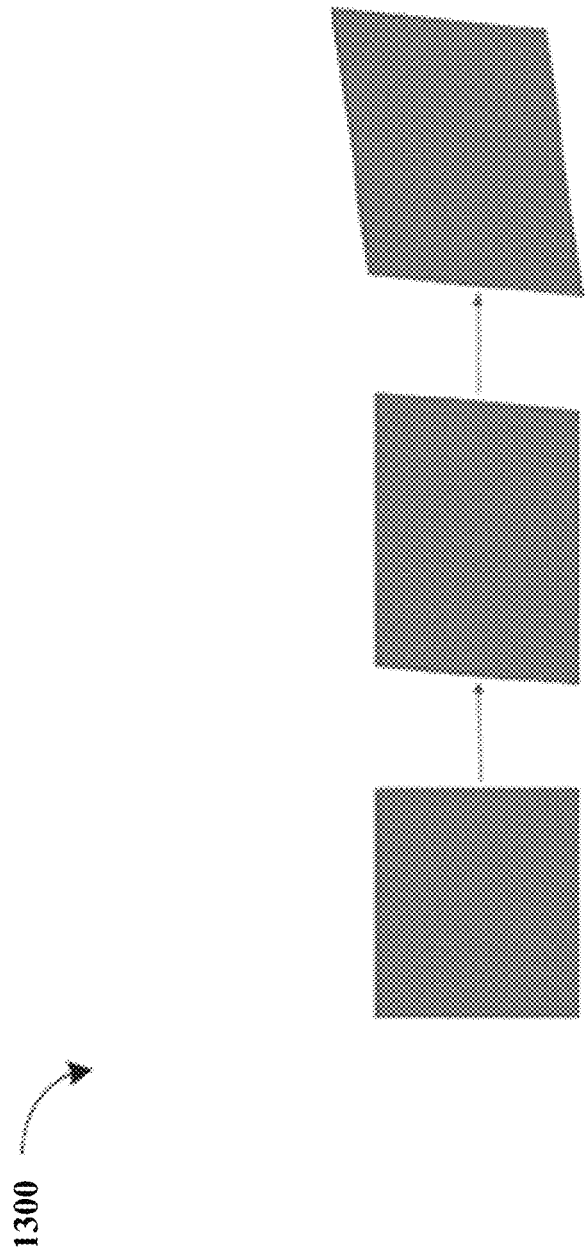
FIG. 13 is a block diagram of features with respect to warped motion compensation according to exemplary embodiments.

FIG. 13 is a block diagram 1300 of features with respect to warped motion compensation according to exemplary embodiments. For example, AV1 introduces two affine prediction models, namely, a global and a local warped motion compensation. The former signals frame-level affine model between a frame and its reference while the latter handles varying local motions implicitly with minimal overhead. Local motion parameters are derived at the block level using 2D motion vectors from the causal neighbors. This affine model is realized through a consecutive horizontal and vertical shearing operation based upon an 8-tap interpolation filter at 1/64 pixel precision. FIG. 13 shows a two-step warping process of horizontal-shearing followed by vertical one.

Figure 14:
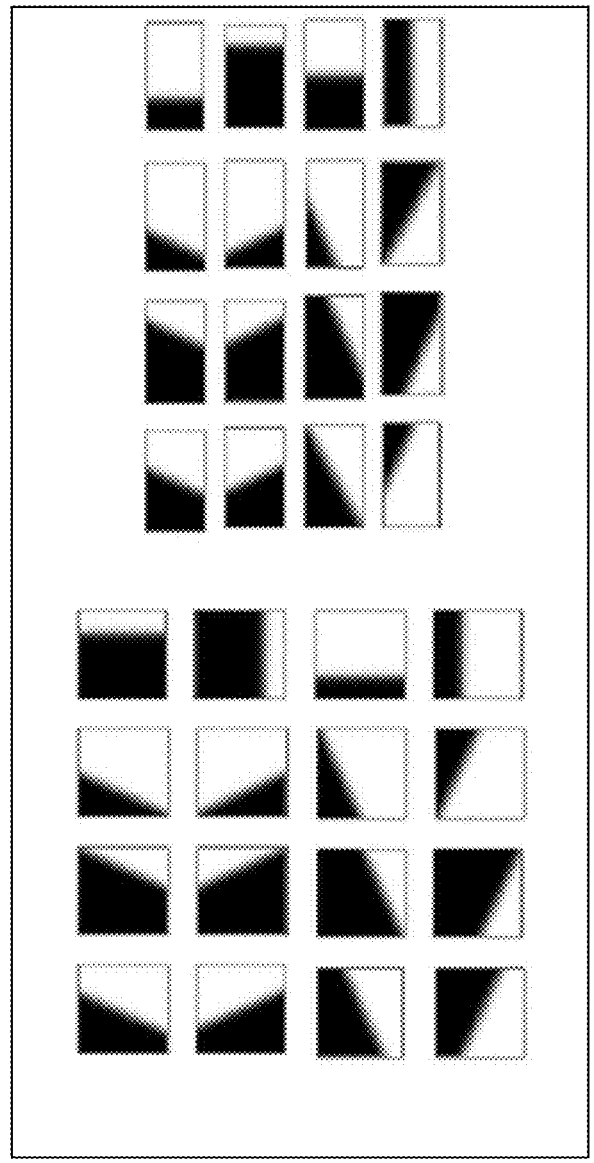
FIG. 14 is a block diagram of features with respect to advanced compound prediction according to exemplary embodiments.

FIG. 14 is a block diagram 1400 of features with respect to advanced compound prediction according to exemplary embodiments. For example, according to embodiments AV1 may allow for more versatile prediction at each pixel position (i,j) as follows (definition 1 ("Def. 1")):

$$p(i,j) \triangleq m(i,j)P_1(i,j) + (1-m(i,j))p_2 \quad \text{Def. 1}$$

where $p_1$ and $p_2$ are two predictions and m(i,j) is a weighting factor in [0,1] looked up from predefined tables.

For a compound wedge prediction there is a predefined set of 16 possible wedge partitions is provided in AV1 and its chosen wedge index is signaled. Its orientations include horizontal, vertical, and oblique with slopes of ±2 or ±0.5 for both the square and rectangular blocks. In order to mitigate spurious artifacts, soft-cliff-shaped 2D wedge masks are employed.

For a difference-modulated masked prediction, according to embodiments AV1 may allow for some regions of the prediction to come more heavily from one prediction than the other. More specifically, the following form of mask is used ("Def. 2"):

$$m(i,j) \triangleq b + a|p_1(i,j) - p_2(i,j)| \quad \text{Def. 2}$$

where b controls the influence of the first predictor and a ensures smooth modulation.

For a frame distance based compound prediction, according to embodiments AV1 may include a modified weighting scheme accounting for frame distance, which is defined as the absolute difference between timestamps of two frames. In order to take into consideration not only the temporal distance, but also the reduction of quantization noise through averaging effects of multiple references, AV1 employs a scheme based on the frame distance while giving slightly more weight toward the distant predictor as follows ("Def. 3" and "Def 4"):

$$p \stackrel{\Delta}{=} \text{round}(w_1 * p_1 + w_2 * p_2 + 8) \gg 4 \qquad \text{Def. 3}$$

$$(w_1, w_2) \stackrel{\Delta}{=} \begin{cases} (9, 7), & \text{when } 2d_2 < 3d_1 \\ (11, 5), & \text{when } 2d_2 < 5d_1 \\ (12, 4), & \text{when } 2d_2 < 7d_1 \\ (13, 3), & \text{when } 2d_2 \geq 7d_1 \end{cases} \qquad \text{Def. 4}$$

where p is the frame distance-based prediction and $p_1$ and $p_2$ are prediction values from two reference frames. The weights ($w_1$,$w_2$) are determined as above where $d_1$ and $d_2$ represent the frame distances of the current frame from the two references.

For a compound inter-intra prediction, according to embodiments AV1 can combine intra and inter predictions and four frequently used intra modes are supported for the intra-part. The masks associated with this mode are two types: (i) smooth wedge masks similar to the ones used for inter-inter modes, (ii) mode-dependent masks decaying along the primary direction of the intra mode.

According to exemplary embodiments, for each transform unit, AV1 coefficient coding starts with signaling a skip sign, and is followed by signaling the transform kernel type and the end-of-block (eob) position when the skip sign is zero. Then each coefficient value is mapped to multiple level maps and the sign.

After the eob position is coded, the lower-level map and the middle-level map are coded in reverse scan order, the former indicating if the coefficient magnitude is between 0 and 2 while the latter indicating if the range is between 3 and 14. The next step codes, in the forward-scanning order, the sign of the efficient as well as the residual value of the coefficient larger than 14 by Exp-Golomb code.

As for the use of context modeling, the lower-level map coding incorporates the transform size and directions as well as up to five neighboring coefficient information. On the other hand, the middle-level map coding follows a similar approach as with the lower-level amp coding except that the number of neighboring coefficients is down to two. The Exp-Golomb code for the residual level as well as the sign of AC coefficient are coded without any context model while the sign of DC coefficient is coded using its neighbor transform-unit's dc sign.

VVC Draft 6 supports a mode where the chroma residuals are coded jointly. The usage (activation) of a joint chroma coding mode is indicated by a TU-level flag tu_joint_cbcr-_residual_flag and the selected mode is implicitly indicated by the chroma CBFs. The flag tu_joint_cbcr_residual_flag is present if either or both chroma CBFs for a TU are equal to 1. In the PPS and slice header, chroma QP offset values are signalled for the joint chroma residual coding mode to differentiate from the chroma QP offset values signalled for regular chroma residual coding mode. These chroma QP offset values are used to derive the chroma QP values for those blocks coded using the joint chroma residual coding mode. When a corresponding joint chroma coding mode (mode 2 in Table 1) is active in a TU, this chroma QP offset is added to the applied luma-derived chroma QP during quantization and decoding of that TU. For the other modes (modes 1 and 3 in Table 1), the chroma QPs are derived in the same way as for conventional Cb or Cr blocks. The reconstruction process of the chroma residuals (resCb and resCr) from the transmitted transform blocks is depicted in Table 1. When this mode is activated, one single joint chroma residual block (resJointC[x][y] in Table 1) is signalled, and residual block for Cb (resCb) and residual block for Cr (resCr) are derived considering information such as tu_cbf_cb, tu_cbf_cr, and CSign, which is a sign value specified in the slice header.

The three joint chroma coding modes described above are only supported in intra coded CU. In inter-coded CU, only mode 2 is supported. Hence, for inter coded CU, the syntax element tu_joint_cbcr_residual_flag is only present if both chroma cbfs are 1. Table 1 below indicates a reconstruction of chroma residuals, and the value CSign is a sign value (+1 or −1), which is specified in the slice header while resJointC[ ][ ] is the transmitted residual.

TABLE 1

| tu_cbf_cb | tu_cbf_cr | reconstruction of Cb and Cr residuals | mode |
|---|---|---|---|
| 1 | 0 | resCb[x][y] = resJointC[x][y]<br>resCr[x][y] = (CSign * resJointC[x][y] ) >> 1 | 1 |
| 1 | 1 | resCb[x][y] = resJointC[x][y]<br>resCr[x][y] = CSign * resJointC[x][y] | 2 |
| 0 | 1 | resCb[x][y] = (CSign * resJointC[x][y]) >> 1<br>resCr[x][y] = resJointC[x][y] | 3 |

The three joint chroma coding modes described above are only supported in intra coded CU. In inter-coded CU, only mode 2 is supported. Hence, for inter coded CU, the syntax element tu_joint_cbcr_residual_flag is only present if both chroma cbfs are 1. Table 1 below indicates a reconstruction of chroma residuals, and the value CSign is a sign value (+1 or −1), which is specified in the slice header while resJointC[ ][ ] is the transmitted residual.

Figure 15:
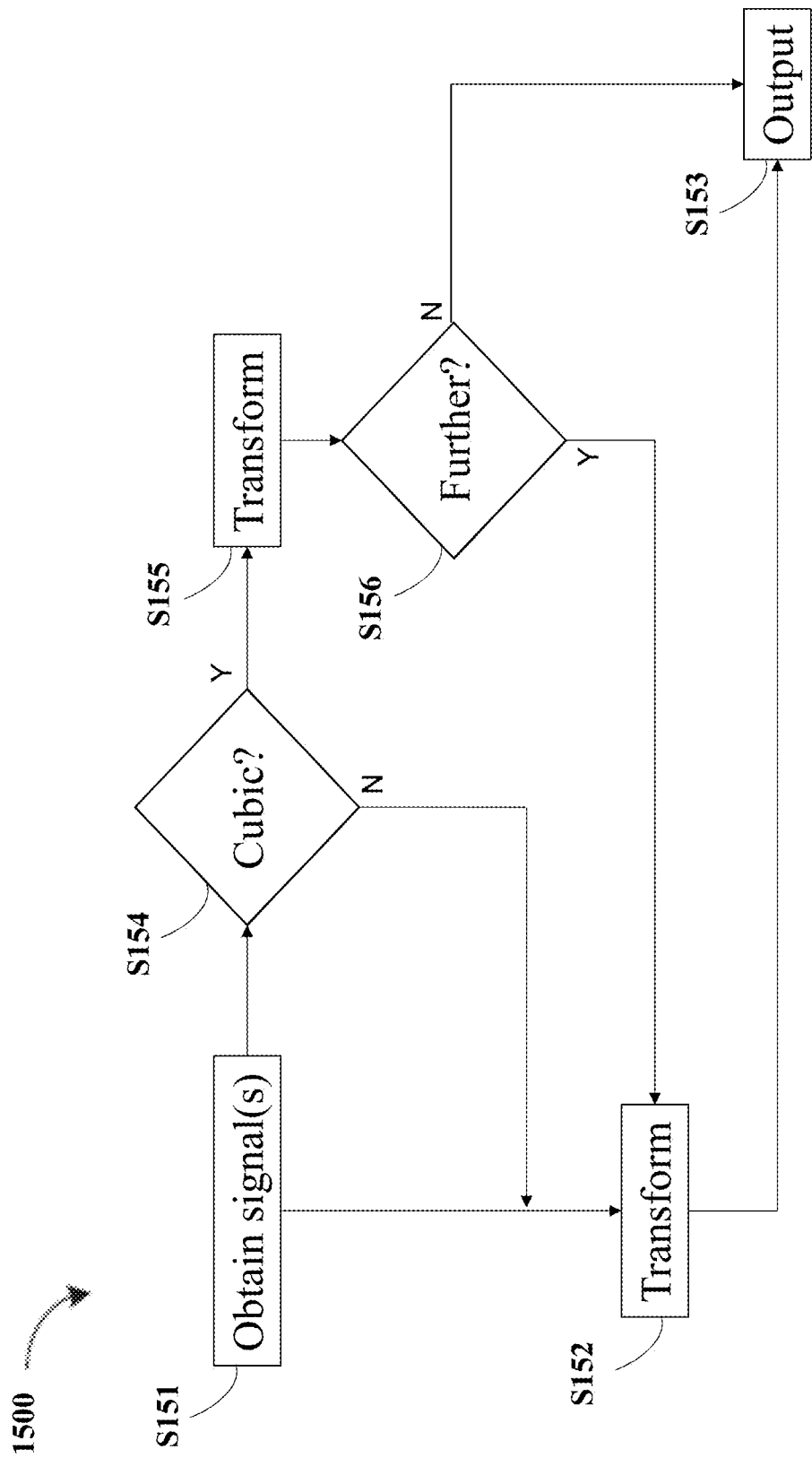
FIG. 15 is a flow diagram of features according to exemplary embodiments.

FIG. 15 is a flow diagram 1500 of features according to exemplary embodiments.

Figure 16:
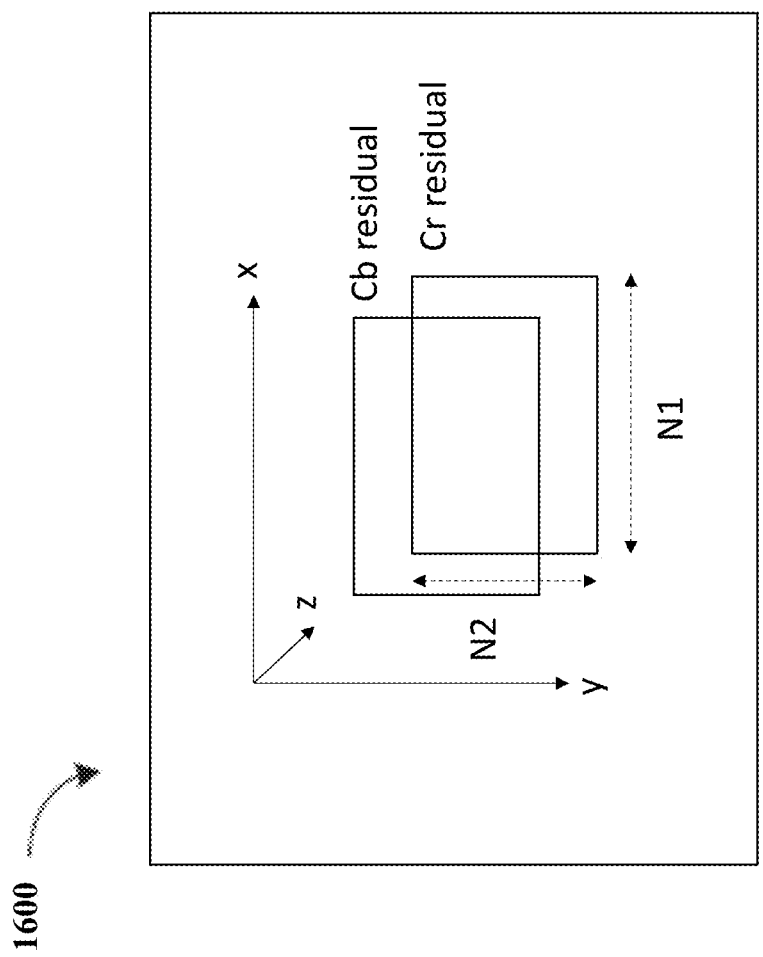
FIG. 16 is a spatial diagram of features with respect to residuals put together as a 3D cube according to exemplary embodiments.

FIG. 16 is a spatial diagram of features with respect to residuals put together as a 3D cube according to exemplary embodiments. The features of FIG. 16 and those described with respect to the other figures herein may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. It is assumed that one or more N1×N2 Cb prediction residual block and its corresponding Cr prediction residual block are given as input at S151.

At S151, there is a transforming of two N1×N2 Cb and Cr prediction-residual signal blocks into another one or more signal blocks of size M×L, where M×L is less than or equal to 2×N1×N2; however, one or more modifications may be substituted or added at S151.

Improvements in a technical problem with respect to the above-described compression, for example, may be effected by transforms described herein which remove redundancies between any of chroma prediction residuals and similar signals.

For example, according to exemplary embodiments, an N1×N2 Cb residual block and its corresponding Cr residual block are put together as one block, and one transform is performed on this one block. There may be a 2D-transform in which there is a vectorization of each input channel separately by various scanning orders to achieve transform coefficients of size L×M (herein "Type-I"). There may be a 2D-transform in which there is a vectorization of two input channels by interleaving in addition to the scanning orders mentioned above (herein "Type-II").

As more specific embodiments of Type-I and Type II, there may be separate coding of two N1×N2 transform coefficient blocks according to exemplary embodiments with respect to one or more of:
- (2×N1×N2) by (2×N1×N2) KLT (Karhunen-Loève Transform),
- Reduced dimension KLT (RD-KLT),
- Separable approximation of RD-KLT,
- Givens/Permutation matrix decomposition, and
- Combinations of Trigonometric transforms.

In one embodiment, when putting Cb and Cr together as one block at S151, the Cb and Cr residuals are vectorized separately following a zig-zag, raster, or diagonal scanning order, then concatenated to form a (2×N1×N2) by 1 vector. It is transformed by an (L×M) by (2×N1×N2) matrix to form a signal block of size (L×M) by 1. Its coefficients are quantized and the quantization indices are signaled. The decoding process dequantizes the indices and inverse-transforms them by a (2×N1×N2) by (L×M) matrix to obtain the reconstructed 2×N1×N2 vector, which can be reverse-scanned back to reconstructed Cb and Cr residual blocks.

In one embodiment, when putting Cb and Cr together as one block at S151, the Cb residual block and its corresponding Cr residual block are vectorized in an interleaved manner (i.e., one sample from Cb and the next sample from Cr) with each sample taken from the residual blocks following a zig-zag, raster, or diagonal scanning order to form a (2×N1×N2) by 1 vector. It is then transformed by an (L×M) by (2×N1×N2) matrix to form a transformed signal block of size (L×M) by 1. Its coefficients are quantized and the quantization indices are signaled. The decoding process dequantizes the indices and inverse-transforms them by a (2×N1×N2) by (L×M) matrix to obtain the reconstructed 2×N1×N2 vector, which can be reverse-scanned back to reconstructed Cb and Cr residual blocks.

In one embodiment, at S151 there is also a setting of L×M equal to 2×N1×N2, and the output of transform is further split to two N1×N2 blocks, which are separately further quantized, and decoded or entropy coded into the bitstream at S153.

In one embodiment, at S151 when L×M is equal to 2×N1×N2, the above transform matrix is of size (2×N1×N2) by (2×N1×N2) and can be determined as the KLT (Karhunen-Loève Transform). Given the 2×N1×N2 by 1 input vector signal X (assuming it was mean-removed to have zero-mean), the (2×N1×N2) by (2×N1×N2) covariance matrix $R_{XX} \triangleq E[XX^T]$ satisfies the following equation ("Eq. 2"):

$$R_{XX} I_j = \lambda_j I_j \qquad \text{Eq. 2}$$

where $\lambda_j$ and $I_j$ are j-th eigenvalue and the corresponding eigenvector of $R_{XX}$.

The KLT matrix H has the above eigenvector as its rows and transforms X into Y as follows ("Eq. 3"):

$$Y = HX \qquad \text{Eq. 3}$$

where $H \triangleq [I_1 \ I_2 \ \ldots \ I_{2 \times N1 \times N2}]^T$.

The elements of Y are uncorrelated and their variances are equal to the eigenvalues. In addition, H is an orthogonal transform so that the input signal vector X can be recovered as follows ("Eq. 4"):

$$X = H^T Y \qquad \text{Eq. 4}$$

In one embodiment, at S151 the above (L×M) by (2×N1×N2) matrix can be determined by selecting only L×M eigenvectors corresponding to the L×M largest eigenvalues from (2×N1×N2) basis vectors of the KLT.

In one embodiment, at S151 the above determined (L×M) by (2×N1×N2) KLT can be approximated by its separable approximations. As an example, the said KLT matrix H can be approximated by solving the following optimization problem (problem 1 ("Prob. 1")):

$$\min_{P,S} \|H - P_1 S P_2\|_F \qquad \text{Prob. 1}$$

where S is a separable row/column matrix and $P_1$ and $P_2$ are permutation matrices to be determined.

In one embodiment, at S151 the above (L×M) by (2×N1×N2) matrix can be constructed as multiple stages of a Givens rotation matrix and/or a permutation matrix. As an example, the said KLT matrix H can be approximated by solving the following optimization problem ("Prob. 2"):

$$\min_{T} \|H - T\|_F \qquad \text{Prob. 2}$$

where $T \triangleq \Pi_{k=1}^{K} P_k G_k P_k^T$ is a concatenation of multiple stages, each of which consists of a product of a Givens rotation matrix with a permutation matrix and its inverse.

In one embodiment, at S151 the above (L×M) by (2×N1×N2) matrix can be adaptively constructed from a set of DCT/DST transforms.

At S154, it may be determined whether an N1×N2 Cb residual block and its corresponding Cr residual block are to be put together as one 2×N1×N2 three-dimensional (3-D) cubic as shown in FIG. 16 with the cubic 1600, and if so then at S155 a 3-D transform is performed on this one cubic.

According to exemplary embodiments, there may be any of fully-separable 3-D transforms and 1D+2D transforms used with these described features.

In one embodiment, at S155 this three-dimensional (3-D) transform can be done separately along three axes. That is, an N1-point 1-D transform is performed for each of the N1×1 vectors along x-axis, and an N2-point 1-D transform is performed for each of the N2×1 vectors along y-axis, and another 2-point transform is performed for each of the 2×1 vectors along the z axis. The order of applications of these transforms can be arbitrary.

In one embodiment, at S155 this three-dimensional (3-D) transform can be done separately along the z-axis while an arbitrary 2-D transform is performed for the x-y planes. That is, a two-point 1-D transform is performed for each of the 2×1 vectors along z-axis while an (N1×N2) transform is performed for the x-y planes.

At S156, it may be determined whether to further apply one or more of the transforms described with respect to S152 as a secondary transform with the input being primary transform coefficients of chroma prediction residuals.

For example, for each N1×N2 chroma residual, it only takes K1 transform coefficients, and these two K1 coefficients are concatenated to form the input to the Secondary transform as described with respect to S152 and specific exemplary embodiments may include one or more of:
- a restriction on the type of primary transform for which the Secondary transform will be applied,
- a zeroing-out of certain coefficients of the input to the secondary transform, and
- a separate coding of the primary-transform-only coefficients and the rest.

If so from S156, then at S152 from S156 in one embodiment, the input of the forward secondary transform is the concatenation of the two sets of first K1 (K⇐N1×N2)

coefficients along the forward scanning order each from transformed Cb residual and Cr residual, and the output of the forward secondary transform of size K2 by (2×K1) is a set of K2 coefficients which replace the same two sets of K1 input coefficients. This set of K2 coefficients is entropy-coded separately from the two sets of (N1×N2−K1) coefficients on which the secondary transform is not applied. The input of the inverse secondary transform of size (2×K1) by K2 is the quantized coefficient vector of size K2 by 1 and the output of the inverse secondary transform is a coefficient vector of size (2×K1), from which each K1 coefficients will be concatenated back with each of the (N1×N2−K1) coefficients entropy-coded separately. In one embodiment, if the coordinate (x, y) associated with the coefficients meets the condition that x+y is greater than or equal to a given threshold value T, then the coefficients are always set as 0. Example values of T includes, but not limited to integers between 0 and 32. In one embodiment, the coefficients which apply both primary and secondary transform and the coefficient which apply only primary transform are coded separately. That is, the coefficients which apply both primary and secondary transform may be coded first, the coefficient which apply only primary transform are coded second, and vice versa.

Although the flow diagram 1500 has been described with respect to chroma, it is also disclosed herein that the flow diagram 1500 may include other embodiments. In one embodiment, the said methods are applied to the Luma prediction residual with either one of the chroma prediction residuals. In one embodiment, the said methods are applied between a selected two components of any multi-component signals where applicable. In one embodiment, any of the methods of S152 and of S152 from S156 can be applied for the entire M-component signals by concatenating the M input blocks. In one embodiment, the methods with respect to S155 in can be applied for the entire M-component signals by performing an M-dimensional transform.

That is, there may be a generalization to other types of multi-channel signal such that a residual from Luma can be correlated to that of Chroma, generic multichannel signals can benefit also, methods of 2D-transform, S152, and Secondary-transform, S152 from S156, can be applied by concatenating the M-input blocks to form the input in M-channel signal cases, and an M-dimensional transform may be applied.

The output 153 may be an output with respect to any one or more of coding and decoding by the features described herein and discussed further below with respect to FIGS. 17-19.

Figure 17:
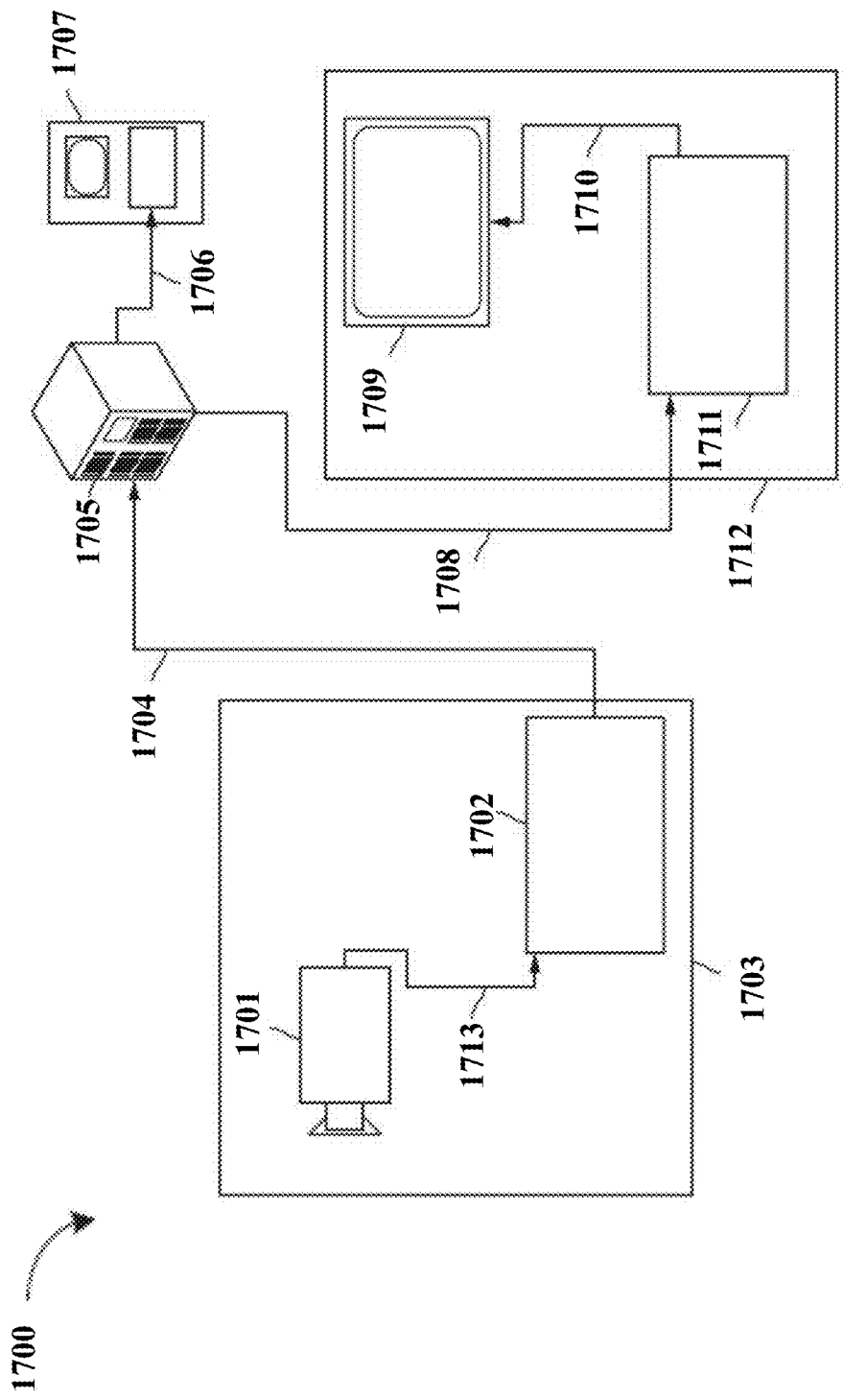
FIG. 17 is a block diagram of features with respect to a system according to exemplary embodiments.

FIG. 17 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 1703, that can include a video source 1701, for example a digital camera, creating, for example, an uncompressed video sample stream 1713. That sample stream 1713 may be emphasized as a high data volume when compared to encoded video bitstreams and can be processed by an encoder 1702 coupled to the camera 1701. The encoder 1702 can include hardware, software, or a combination thereof to enable or implement aspects of the disclosed subject matter as described in more detail below. The encoded video bitstream 1704, which may be emphasized as a lower data volume when compared to the sample stream, can be stored on a streaming server 1705 for future use. One or more streaming clients 1712 and 1707 can access the streaming server 1705 to retrieve copies 1708 and 1706 of the encoded video bitstream 1704. A client 1712 can include a video decoder 1711 which decodes the incoming copy of the encoded video bitstream 1708 and creates an outgoing video sample stream 1710 that can be rendered on a display 1709 or other rendering device (not depicted). In some streaming systems, the video bitstreams 1704, 1706 and 1708 can be encoded according to certain video coding/compression standards. Examples of those standards are noted above and described further herein.

Figure 18:
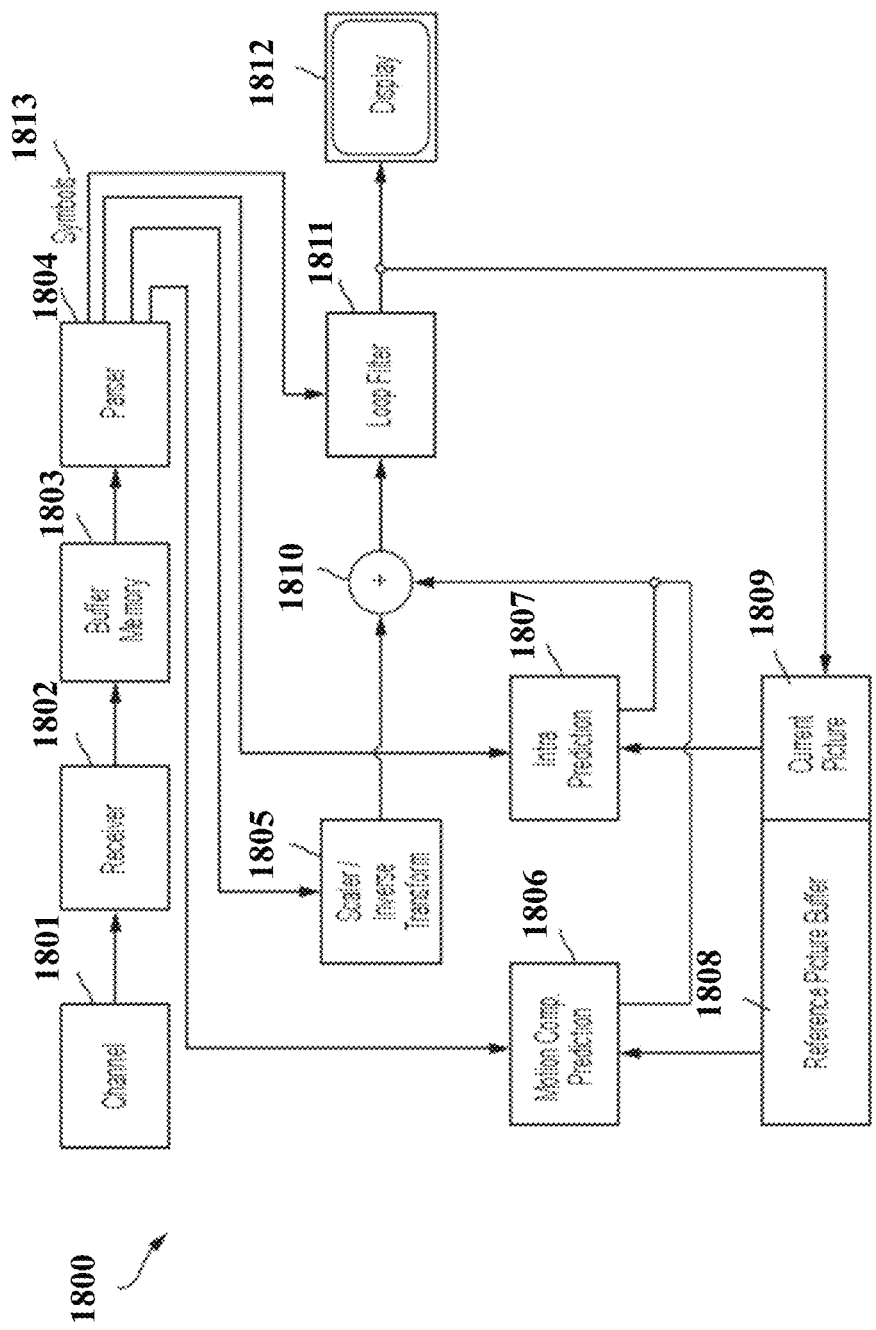
FIG. 18 is a block diagram of features with respect to a decoder according to exemplary embodiments.

FIG. 18 may be a functional block diagram of a video decoder 1800 according to an embodiment of the present invention.

A receiver 1802 may receive one or more codec video sequences to be decoded by the decoder 1800; in the same or another embodiment, one coded video sequence at a time, where the decoding of each coded video sequence is independent from other coded video sequences. The coded video sequence may be received from a channel 1801, which may be a hardware/software link to a storage device which stores the encoded video data. The receiver 1802 may receive the encoded video data with other data, for example, coded audio data and/or ancillary data streams, that may be forwarded to their respective using entities (not depicted). The receiver 1802 may separate the coded video sequence from the other data. To combat network jitter, a buffer memory 1803 may be coupled in between receiver 1802 and entropy decoder/parser 1804 ("parser" henceforth). When receiver 1802 is receiving data from a store/forward device of sufficient bandwidth and controllability, or from an isosychronous network, the buffer 1803 may not be needed, or can be small. For use on best effort packet networks such as the Internet, the buffer 1803 may be required, can be comparatively large and can advantageously of adaptive size.

The video decoder 1800 may include a parser 1804 to reconstruct symbols 1813 from the entropy coded video sequence. Categories of those symbols include information used to manage operation of the decoder 1800, and potentially information to control a rendering device such as a display 1812 that is not an integral part of the decoder but can be coupled to it. The control information for the rendering device(s) may be in the form of Supplementary Enhancement Information (SEI messages) or Video Usability Information parameter set fragments (not depicted). The parser 1804 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 1804 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 1804 may perform entropy decoding/parsing operation on the video sequence received from the buffer 1803, so to create symbols 1813. The parser 1804 may receive encoded data, and selectively decode particular symbols 1813. Further, the parser 1804 may determine whether the particular symbols 1813 are to be provided to a Motion Compensation Prediction unit 1806, a scaler/inverse transform unit 1805, an Intra Prediction Unit 1807, or a loop filter 1811.

Reconstruction of the symbols 1813 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 1804. The flow of such subgroup control information between the parser 1804 and the multiple units below is not depicted for clarity.

Beyond the functional blocks already mentioned, decoder 1800 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 1805. The scaler/inverse transform unit 1805 receives quantized transform coefficient as well as control information, including which transform to use, block size, quantization factor, quantization scaling matrices, etc. as symbol(s) 1813 from the parser 1804. It can output blocks comprising sample values, that can be input into aggregator 1810.

In some cases, the output samples of the scaler/inverse transform 1805 can pertain to an intra coded block; that is: a block that is not using predictive information from previously reconstructed pictures, but can use predictive information from previously reconstructed parts of the current picture. Such predictive information can be provided by an intra picture prediction unit 1807. In some cases, the intra picture prediction unit 1807 generates a block of the same size and shape of the block under reconstruction, using surrounding already reconstructed information fetched from the current (partly reconstructed) picture 1809. The aggregator 1810, in some cases, adds, on a per sample basis, the prediction information the intra prediction unit 1807 has generated to the output sample information as provided by the scaler/inverse transform unit 1805.

In other cases, the output samples of the scaler/inverse transform unit 1805 can pertain to an inter coded, and potentially motion compensated block. In such a case, a Motion Compensation Prediction unit 1806 can access reference picture memory 1808 to fetch samples used for prediction. After motion compensating the fetched samples in accordance with the symbols 1813 pertaining to the block, these samples can be added by the aggregator 1810 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 1813 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 1810 can be subject to various loop filtering techniques in the loop filter unit 1811. Video compression technologies can include in-loop filter technologies that are controlled by parameters included in the coded video bitstream and made available to the loop filter unit 1811 as symbols 1813 from the parser 1804, but can also be responsive to meta-information obtained during the decoding of previous (in decoding order) parts of the coded picture or coded video sequence, as well as responsive to previously reconstructed and loop-filtered sample values.

The output of the loop filter unit 1811 can be a sample stream that can be output to the render device 1812 as well as stored in a reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser 1804), the current reference picture 1809 can become part of the reference picture buffer 1808, and a fresh current picture memory can be reallocated before commencing the reconstruction of the following coded picture.

The video decoder 1800 may perform decoding operations according to a predetermined video compression technology. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 1802 may receive additional (redundant) data with the encoded video. The additional data may be included as part of the coded video sequence(s). The additional data may be used by the video decoder 1800 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 19:
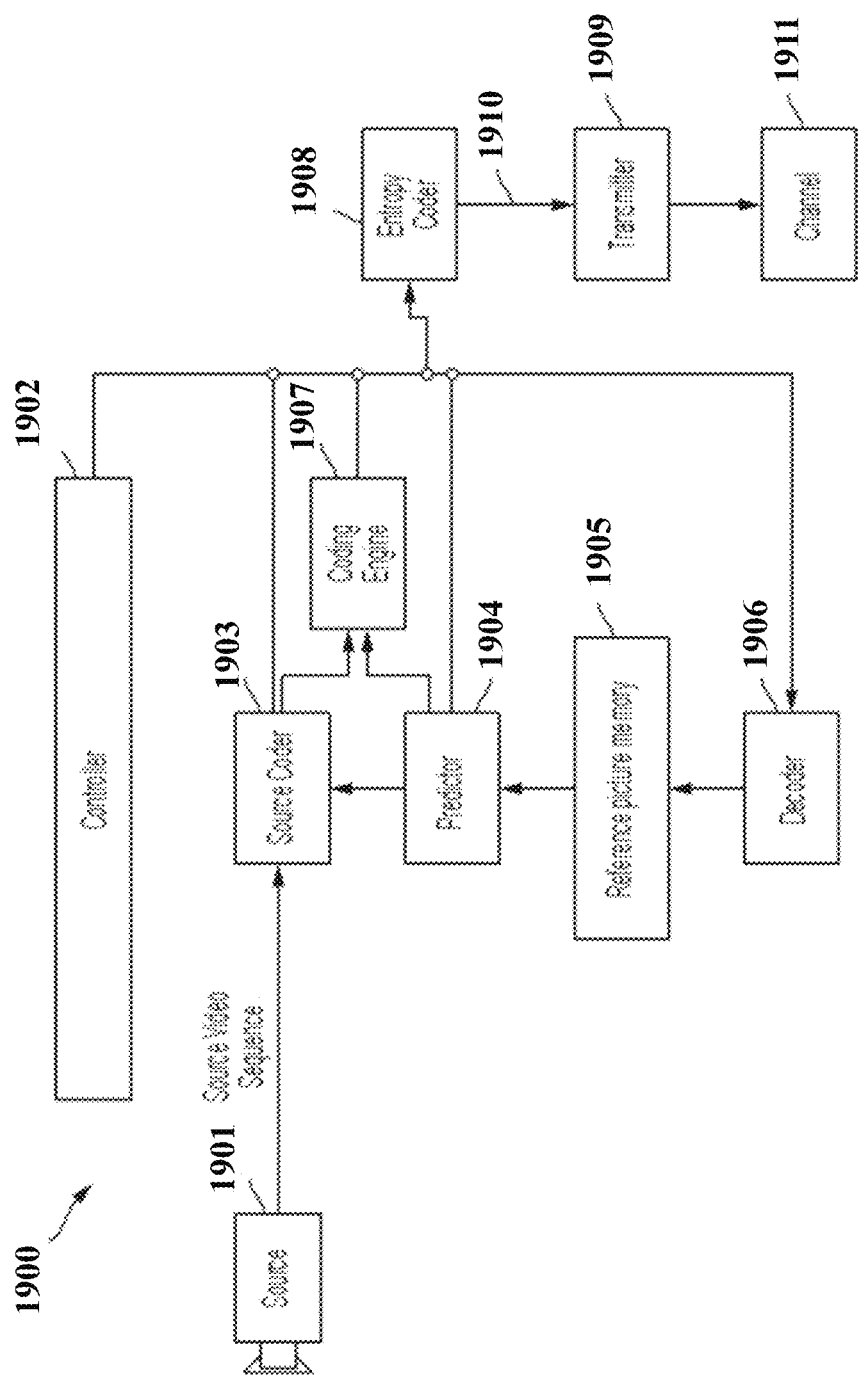
FIG. 19 is a block diagram of features with respect to an encoder according to exemplary embodiments.

FIG. 19 may be a functional block diagram of a video encoder 1900 according to an embodiment of the present disclosure.

The encoder 1900 may receive video samples from a video source 1901 (that is not part of the encoder) that may capture video image(s) to be coded by the encoder 1900.

The video source 1901 may provide the source video sequence to be coded by the encoder (1703) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 1901 may be a storage device storing previously prepared video. In a videoconferencing system, the video source 1901 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 1900 may code and compress the pictures of the source video sequence into a coded video sequence 1910 in real time or under any other time constraints as required by the application. Enforcing appropriate coding speed is one function of controller 1902. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 1902 as they may pertain to video encoder 1900 optimized for a certain system design.

Some video encoders operate in what a person skilled in the art readily recognizes as a "coding loop." As an over-simplified description, a coding loop can consist of the encoding part of an encoder 1902 ("source coder" henceforth) (responsible for creating symbols based on an input picture to be coded, and a reference picture(s)), and a (local) decoder 1906 embedded in the encoder 1900 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 1905. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 1906 can be the same as of a "remote" decoder 1800, which has already been described in detail above in conjunction with FIG. 18. Briefly referring also to FIG. 19, however, as symbols are available and en/decoding of symbols to a coded video sequence by entropy coder 1908 and parser 1904 can be lossless, the entropy decoding parts of decoder 1800, including channel 1801, receiver 1802, buffer 1803, and parser 1804 may not be fully implemented in local decoder 1906.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 1903 may perform motion compensated predictive coding, which codes an input frame predictively with reference to one or more previously-coded frames from the video sequence that were designated as "reference frames." In this manner, the coding engine 1907 codes differences between pixel blocks of an input frame and pixel blocks of reference frame(s) that may be selected as prediction reference(s) to the input frame.

The local video decoder 1906 may decode coded video data of frames that may be designated as reference frames, based on symbols created by the source coder 1903. Operations of the coding engine 1907 may advantageously be lossy processes. When the coded video data may be decoded at a video decoder (not shown in FIG. 19), the reconstructed video sequence typically may be a replica of the source video sequence with some errors. The local video decoder 1906 replicates decoding processes that may be performed by the video decoder on reference frames and may cause reconstructed reference frames to be stored in the reference picture cache 1905. In this manner, the encoder 1900 may store copies of reconstructed reference frames locally that have common content as the reconstructed reference frames that will be obtained by a far-end video decoder (absent transmission errors).

The predictor 1904 may perform prediction searches for the coding engine 1907. That is, for a new frame to be coded, the predictor 404 may search the reference picture memory 1905 for sample data (as candidate reference pixel blocks) or certain metadata such as reference picture motion vectors, block shapes, and so on, that may serve as an appropriate prediction reference for the new pictures. The predictor 1904 may operate on a sample block-by-pixel block basis to find appropriate prediction references. In some cases, as determined by search results obtained by the predictor 1904, an input picture may have prediction references drawn from multiple reference pictures stored in the reference picture memory 1905.

The controller 1902 may manage coding operations of the video coder 1903, including, for example, setting of parameters and subgroup parameters used for encoding the video data.

Output of all aforementioned functional units may be subjected to entropy coding in the entropy coder 1908. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 1909 may buffer the coded video sequence(s) as created by the entropy coder 1908 to prepare it for transmission via a communication channel 1911, which may be a hardware/software link to a storage device which would store the encoded video data. The transmitter 1909 may merge coded video data from the video coder 1903 with other data to be transmitted, for example, coded audio data and/or ancillary data streams (sources not shown).

The controller 1902 may manage operation of the encoder 1900. During coding, the controller 1905 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 1900 may perform coding operations according to a predetermined video coding technology or standard. In its operation, the video coder 1900 may perform various compression operations, including predictive coding operations that exploit temporal and spatial redundancies in the input video sequence. The coded video data, therefore, may conform to a syntax specified by the video coding technology or standard being used.

In an embodiment, the transmitter 1909 may transmit additional data with the encoded video. The source coder 1903 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video decoding performed by at least one processor, the method comprising:
    receiving video data in an AOMedia Video 1 (AV1) format comprising data of at least two chroma prediction-residual signal blocks;
    performing a transformation between at least one signal block, having a size less than or equal to a combination of the chroma prediction-residual signal blocks, and the chroma prediction-residual signal blocks; and
    decoding the video data based on an output of the transformation comprising the at least one signal block having the size less than or equal to the combination of the chroma prediction-residual blocks,
    wherein the chroma prediction-residual signal blocks comprise an N1×N2 Cb residual block and an N1×N2 Cr residual block,
    wherein the at least one signal block comprises a 2×N1×N2 three-dimensional (3-D) cubic,
    wherein the transformation comprises a two-point 1-D transform, on each of 2×1 vectors along a z-axis of the 3-D cubic, and an N1×N2 transform on an x-y plane of the 3-D cubic.

2. The method according to claim 1,
    wherein the transformation further comprises dequantizing signaled indices of coefficients of the at least one signal block, having the size less than or equal to the combination of the chroma prediction-residual signal blocks, and transforming the dequantized signaled indices by a 2×N1×N2 by L×M matrix,
    wherein 2×N1×N2 is a size of the combination of the chroma prediction-residual blocks, and
    wherein L×M is the size less than or equal to the combination of the chroma prediction residual blocs.

3. The method according to claim 2,
    wherein a result of transforming the dequantized signaled indices by a 2×N1×N2 by L×M matrix comprises a reconstructed 2×N1×N2 vector, and
    wherein decoding the video data comprises reconstructing the N1×N2 Cb residual block and the N1×N2 Cr residual block from the reconstructed 2×N1×N2 vector.

4. The method according to claim 3,
    wherein the at least one signal block comprises an interleaving of the at least two chroma prediction-residual signal blocks.

5. The method according to claim 1,
    wherein the transformation comprises an N1-point 1-D transform, on each of N1×1 vectors along an x-axis of the 3-D cubic, an N2-point 1-D transform, on each of N2×1 vectors along a y-axis of the 3-D cubic, and a 2-point transform on each of 2×1 vectors along a z-axis of the 3-D cubic.

6. The method according to claim 1,
    wherein performing the transformation comprises performing a primary transformation and a secondary transformation.

7. The method according to claim 6,
wherein at least one of the primary transformation and the secondary transformation comprises setting coefficients to zero in response to determining a predetermined condition in which a value of a coordinate associated with a coefficient of at least one of the chroma prediction-residual signal blocks is greater than or equal to a threshold value.

8. An apparatus for video decoding, the apparatus comprising:
at least one memory configured to store computer program code;
at least one processor configured to access the computer program code and operate as instructed by the computer program code, the computer program code including:
receiving code configured to cause the at least one processor to receive video data in an AOMedia Video 1 (AV1) format comprising data of at least two chroma prediction-residual signal blocks;
performing code configured to cause the at least one processor to perform a transformation between at least one signal block, having a size less than or equal to a combination of the chroma prediction-residual signal blocks, and the chroma prediction-residual signal blocks; and
decoding code configured to cause the at least one processor to decode the video data based on an output of the transformation comprising the at least one signal block having the size less than or equal to the combination of the chroma prediction-residual blocks,
wherein the chroma prediction-residual signal blocks comprise an N1×N2 Cb residual block and an N1×N2 Cr residual block,
wherein the at least one signal block comprises a 2×N1×N2 three-dimensional (3-D) cubic,
wherein the transformation comprises a two-point 1-D transform, on each of 2×1 vectors along a z-axis of the 3-D cubic, and an N1×N2 transform on an x-y plane of the 3-D cubic.

9. The apparatus according to claim 8,
wherein the transformation comprises dequantizing signaled indices of coefficients of the at least one signal block, having the size less than or equal to the combination of the chroma prediction-residual signal blocks, and transforming the dequantized signaled indices by a 2×N1×N2 by L×M matrix,
wherein 2×N1×N2 is a size of the combination of the chroma prediction-residual blocks, and
wherein L×M is the size less than or equal to the combination of the chroma prediction residual blocs.

10. The apparatus according to claim 9,
wherein a result of transforming the dequantized signaled indices by a 2×N1×N2 by L×M matrix comprises a reconstructed 2×N1×N2 vector, and
wherein decoding the video data comprises reconstructing the N1×N2 Cb residual block and the N1×N2 Cr residual block from the reconstructed 2×N1×N2 vector.

11. The apparatus according to claim 10,
wherein the at least one signal block comprises an interleaving of the at least two chroma prediction-residual signal blocks.

12. The apparatus according to claim 8,
wherein the transformation comprises an N1-point 1-D transform, on each of N1×1 vectors along an x-axis of the 3-D cubic, an N2-point 1-D transform, on each of N2×1 vectors along a y-axis of the 3-D cubic, and a 2-point transform on each of 2×1 vectors along a z-axis of the 3-D cubic.

13. The apparatus according to claim 8,
wherein performing the transformation comprises performing a primary transformation and a secondary transformation.

14. A non-transitory computer readable medium storing a program causing a computer to execute a process, the process comprising:
receiving video data in an AOMedia Video 1 (AV1) format comprising data of at least two chroma prediction-residual signal blocks;
performing a transformation between at least one signal block, having a size less than or equal to a combination of the chroma prediction-residual signal blocks, and the chroma prediction-residual signal blocks; and
decoding the video data based on an output of the transformation comprising the at least one signal block having the size less than or equal to the combination of the chroma prediction-residual blocks,
wherein the chroma prediction-residual signal blocks comprise an N1×N2 Cb residual block and an N1×N2 Cr residual block,
wherein the at least one signal block comprises a 2×N1×N2 three-dimensional (3-D) cubic,
wherein the transformation comprises a two-point 1-D transform, on each of 2×1 vectors along a z-axis of the 3-D cubic, and an N1×N2 transform on an x-y plane of the 3-D cubic.

* * * * *